(12) United States Patent
Higurashi

(10) Patent No.: US 10,771,677 B2
(45) Date of Patent: Sep. 8, 2020

(54) OBSERVATION DEVICE AND FOCUS ADJUSTMENT METHOD

(71) Applicant: Olympus Corporation, Hachioji-shi, Tokyo (JP)

(72) Inventor: Masaki Higurashi, Hachioji (JP)

(73) Assignee: Olympus Corporation, Tokyo (JP)

( * ) Notice: Subject to any disclaimer, the term of this patent is extended or adjusted under 35 U.S.C. 154(b) by 85 days.

(21) Appl. No.: 16/141,942

(22) Filed: Sep. 25, 2018

(65) Prior Publication Data
US 2019/0109995 A1    Apr. 11, 2019

(30) Foreign Application Priority Data
Oct. 10, 2017    (JP) .................... 2017-197123

(51) Int. Cl.
*H04N 5/232* (2006.01)
*G02B 7/36* (2006.01)
*G02B 21/36* (2006.01)
*G06K 9/00* (2006.01)

(52) U.S. Cl.
CPC ......... *H04N 5/232123* (2018.08); *G02B 7/36* (2013.01); *G02B 21/365* (2013.01); *G06K 9/00134* (2013.01)

(58) Field of Classification Search
CPC .............. G01N 21/6458; G02B 21/244; G02B 21/0088; G02B 21/06; G02B 21/006; G02B 21/08; G02B 21/245; G02B 21/34; G02B 21/361; G02B 21/367; G02B 21/365; G02B 7/36; G02B 7/28; G02B 7/282; G02B 7/09; G02B 7/10; G02B 7/365; G06K 9/00134; H04N 5/232123; H04N 5/23212

USPC ........... 348/79; 356/123, 124, 624; 359/383; 250/201.2, 201.7

See application file for complete search history.

(56) References Cited

U.S. PATENT DOCUMENTS

| | | | |
|---|---|---|---|
| 2003/0169363 A1* | 9/2003 | Ogino | H04N 5/23212 348/345 |
| 2004/0061800 A1* | 4/2004 | Yamazaki | H04N 5/23212 348/349 |
| 2008/0225278 A1* | 9/2008 | Namba | G01N 21/6458 356/123 |
| 2008/0252773 A1* | 10/2008 | Oishi | G03B 13/32 348/347 |
| 2009/0086314 A1* | 4/2009 | Namba | G02B 21/361 359/383 |

(Continued)

FOREIGN PATENT DOCUMENTS

| JP | 2008-116526 | 5/2008 |
|---|---|---|
| JP | 2013-116073 | 6/2013 |

*Primary Examiner* — Nathnael Aynalem
(74) *Attorney, Agent, or Firm* — John C. Pokotylo; Pokotylo Patent Services

(57) ABSTRACT

An observation device, comprising an image sensor that forms an image of a specimen, and a processor having a focus control section and an analyzer, wherein the focus control section, in a case where image data for analysis of the specimen by the analyzer is obtained when a plurality of maximum values have been generated for change in contrast evaluation value corresponding to change in the focus position, controls focus position any focus position that corresponds to the plurality of maximum values, and the image sensor outputs image data that has been imaged.

11 Claims, 15 Drawing Sheets

(56) References Cited

U.S. PATENT DOCUMENTS

| | | | |
|---|---|---|---|
| 2009/0237553 A1* | 9/2009 | Song | H04N 5/23212 348/349 |
| 2011/0205403 A1* | 8/2011 | Ito | G02B 7/36 348/241 |
| 2014/0106395 A1 | 4/2014 | Fattinger et al. | |
| 2015/0092101 A1* | 4/2015 | Yamazaki | H04N 5/23212 348/353 |
| 2016/0369223 A1* | 12/2016 | Matsumoto | G02B 21/365 |
| 2017/0003490 A1* | 1/2017 | Sueki | G02B 7/36 |
| 2017/0010455 A1 | 1/2017 | Tsujimoto | |
| 2018/0164542 A1* | 6/2018 | Wakazono | G02B 7/28 |

* cited by examiner

TAKEN IMAGE AT POSITION Pb

TAKEN IMAGE AT POSITION Pq

TAKEN IMAGE AT POSITION Pr

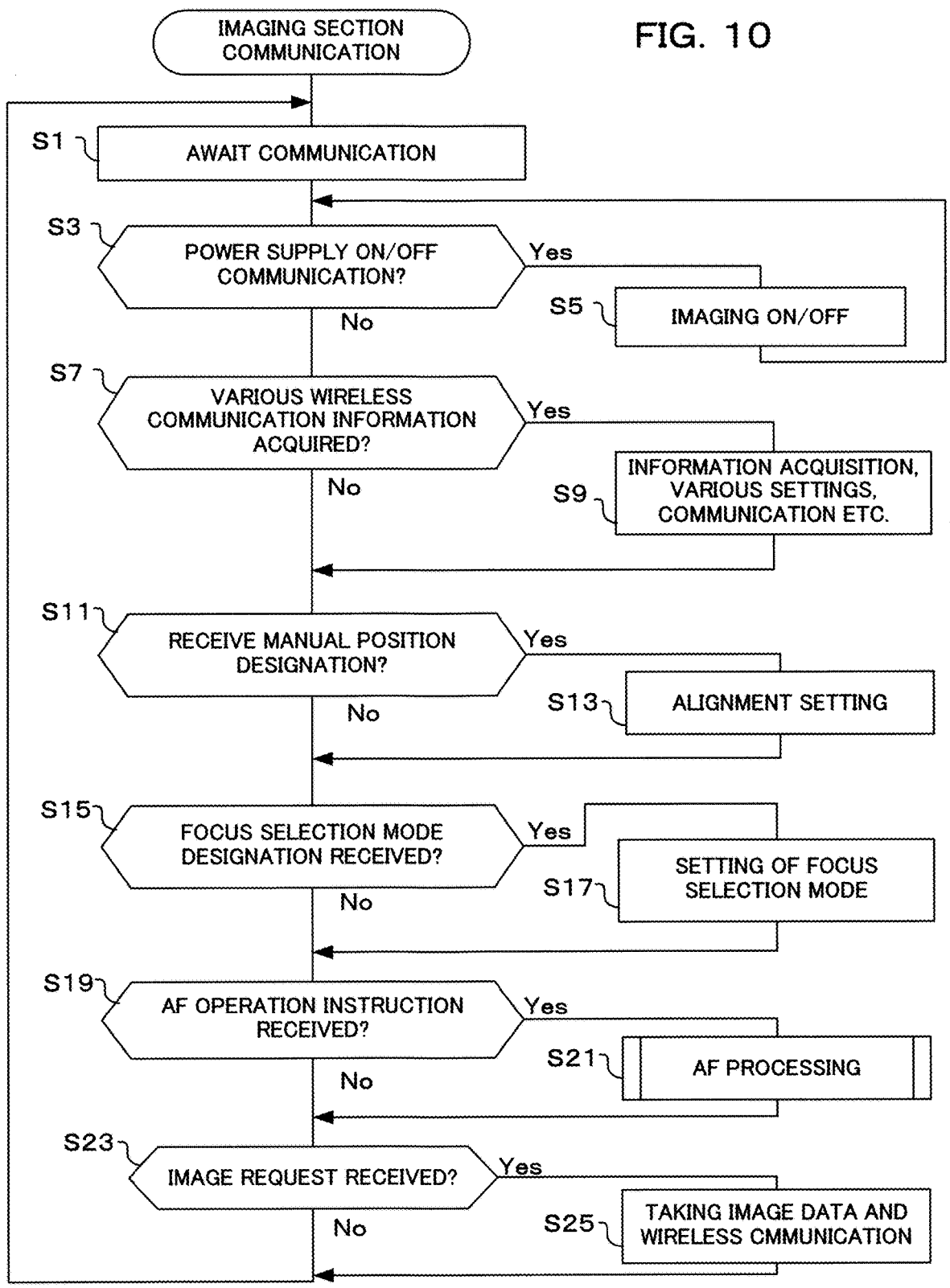

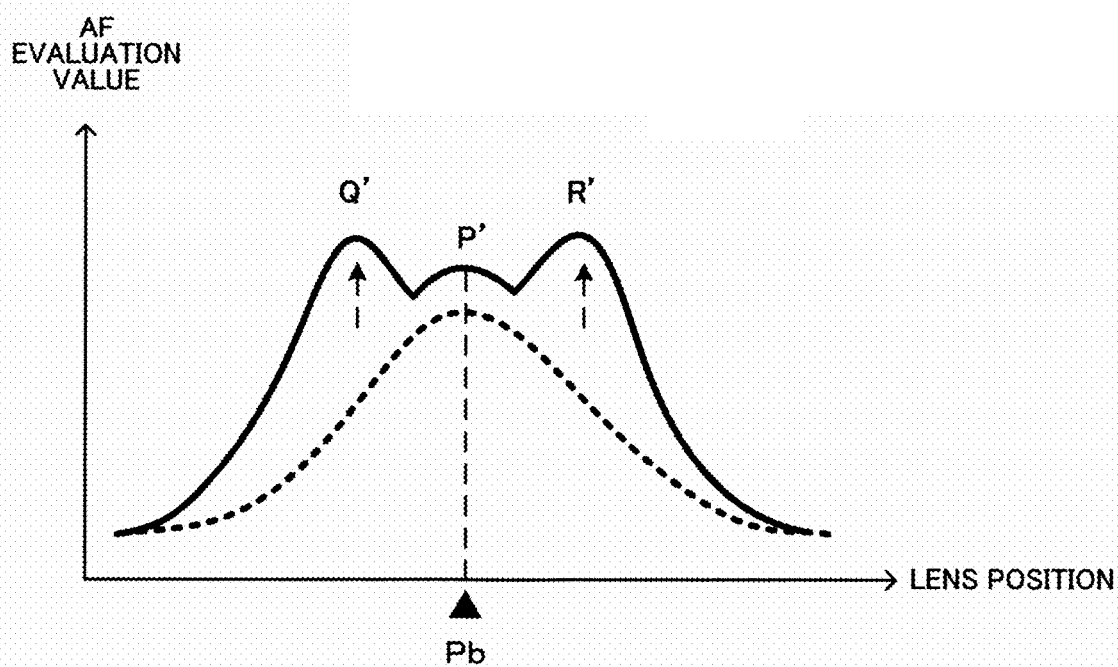

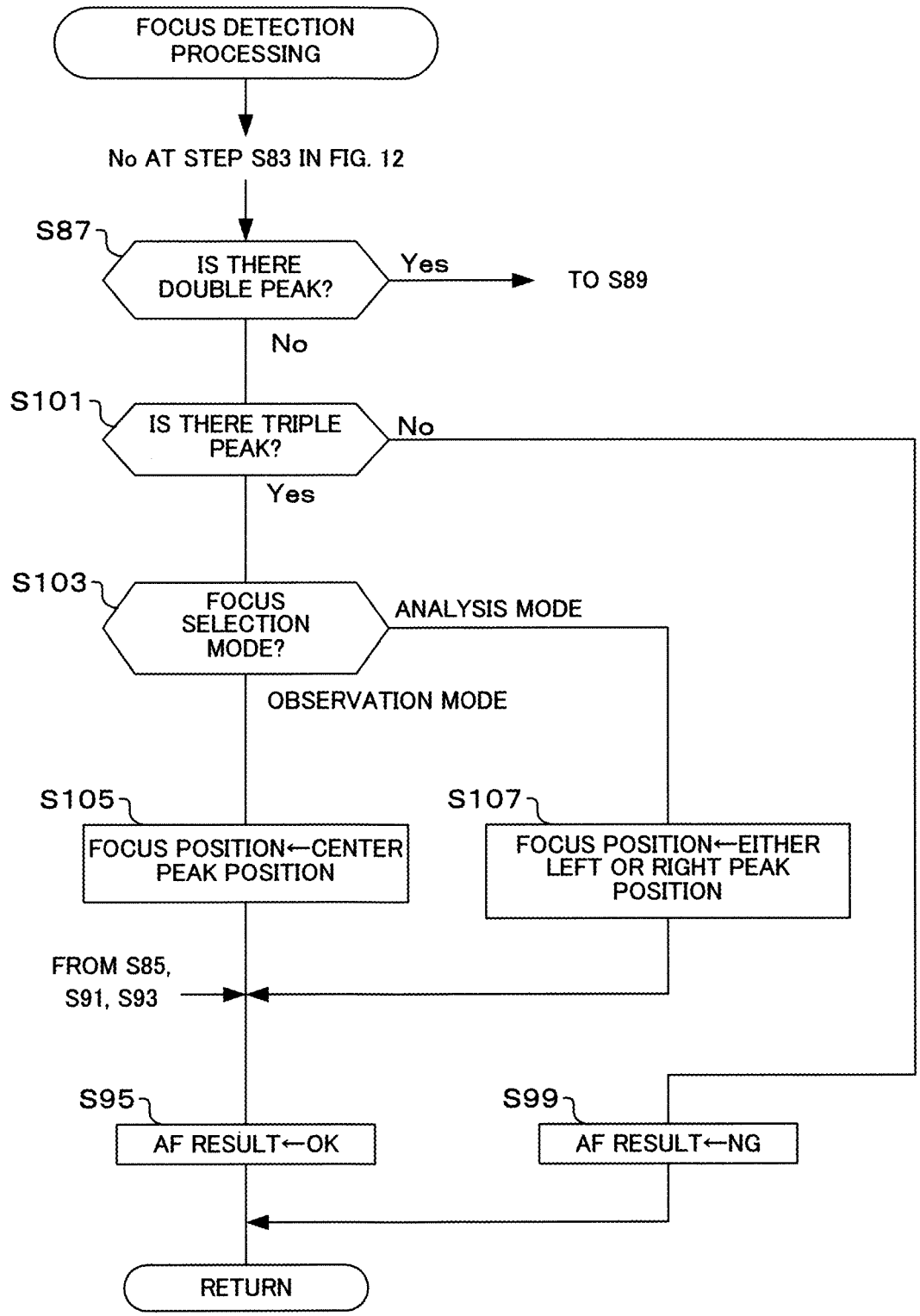

OBSERVATION DEVICE AND FOCUS ADJUSTMENT METHOD

CROSS-REFERENCE TO RELATED APPLICATIONS

Benefit is claimed, under 35 U.S.C. § 119, to the filing date of prior Japanese Patent Application No. 2017-197123 filed on Oct. 10, 2017. This application is expressly incorporated herein by reference. The scope of the present invention is not limited to any requirements of the specific embodiments described in the application.

BACKGROUND OF THE INVENTION

1. Field of the Invention

The present invention relates to an observation device and focus adjustment method that perform imaging of a specimen using an imaging section, and perform focus adjustment on the basis of image data that has been acquired.

2. Description of the Related Art

It is known to have an observation device arranged for a long period of time within a constant temperature oven or incubator that keeps an environment, such as temperature, constant, and observe a specimen such as cells within a culture vessel using an imaging section. According to this device, a sample is arranged inside an incubator for a long period of time, and it is possible to observe using operations from outside. It is possible to realize an efficient and high quality cellular environment without opening and closing of the device and any human intervention. Also, at the time of observation, image data of a specimen such as cells inside a culture vessel is acquired by an imaging section, focus adjustment is performed based on this image data, and it is possible to display an image that is in focus (refer, for example, to Japanese patent laid-open No. 2015-194544 (hereafter referred to as patent publication 1), and Japanese patent laid-open No. 2008-116526 (hereafter referred to as patent publication 2)).

Also, at the time of observation, since focus position of cultured cells changes depending on observation position, is preferable to provide an auto focus (AF) function. Because of this, image data of a specimen such as cells within a culture vessel is acquired by an imaging section, focus adjustment is performed based on this image data, and an image that is in focus is displayed (refer, for example, to patent publications 1 and 2). With patent publication 1, focus position is changed, and a position at which a number of cells that can be observed becomes maximum is made an optimum focus position. With patent publication 2, focus position is determined by referencing brightness information that changes in accordance with focus position.

In the event of performing focus adjustment using contrast AF for a specimen such as cells, transmitted illumination is generally used, and there are cases where two peaks appear in a contrast curve. This is because light beams inside cells are refracted because the cells have a three-dimensional structure, and a light condensing effect arises (refer to FIG. 7 which will be described later). If this type of phenomenon arises, then with a focus adjustment device such as disclosed in patent publications 1 and 2 it is not possible to acquire an observation image that is in focus. Also, with the focus adjustment device disclosed in patent publications 1 and 2 etc. it is also difficult to accurately count a number of cells within the specimen.

SUMMARY OF THE INVENTION

The present inventions provides an observation device and focus adjustment method that are capable of adjustment to an appropriate focus position in accordance with use, even in a case where two or more peaks appear in a contrast curve due to the three-dimensional structure of a specimen such as cells.

An observation device of a first aspect of the present invention comprises, an image sensor that forms an image of a specimen, and a processor having a focus control section and an analyzer, the focus control section changing focus position of the image sensor and calculating contrast evaluation value based on image data output by the image sensor, and controlling focus based on the contrast evaluation value, and the analyzer analyzing the specimen based on image data output by the image sensor, wherein the focus control section, in a case where image data for analysis of the specimen by the analyzer is obtained when a plurality of maximum values have been generated for change in contrast evaluation value corresponding to change in the focus position, controls focus position to any one of focus positions that correspond to the plurality of maximum values, and the image sensor outputs image data that has been imaged.

A focus adjustment method of a second aspect of the present invention is a focus adjustment method for an observation device having an image sensor that forms images of a specimen, the focus adjustment method comprising changing focus position for the image sensor, calculating contrast evaluation value based on image data output by the image sensor and controlling focus based on contrast evaluation value, in a case where image data for analysis of the specimen by the analyzer is obtained when a plurality of maximum values have been generated for change in contrast evaluation value corresponding to change in the focus position, controlling focus position to any focus position that corresponds to the plurality of maximum values, and outputting image data that has been imaged by the image sensor.

A non-transitory computer-readable medium of a third aspect of the present invention, storing a processor executable code, which when executed by at least one processor, the processor being provided within an observation device that has an image sensor for forming an image of a specimen, performs a focus adjustment method, the focus adjustment method comprising changing focus position for the image sensor, calculating contrast evaluation value based on image data output by the image sensor and controlling focus based on contrast evaluation value, in a case where image data for analysis of the specimen by the analyzer is obtained when a plurality of maximum values have been generated for change in contrast evaluation value corresponding to change in the focus position, controlling focus position to any focus position that corresponds to the plurality of maximum values, and outputting image data that has been imaged by the image sensor.

BRIEF DESCRIPTION OF THE DRAWINGS

FIG. 10 is a flowchart showing operation of an imaging section within the cell observation device of one embodiment of the present invention.

FIG. 15 is a graph showing an example of a relationship between lens position and AF evaluation value for the imaging section (in a case where there are three peaks), in the cell observation system of a modified example of one embodiment of the present invention.

FIG. 16 is a flowchart showing focus detection processing of an imaging section within the cell observation device of the modified example of one embodiment of the present invention.

DETAILED DESCRIPTION OF THE PREFERRED EMBODIMENTS

An example applied to a cell observation system, as one embodiment of the present invention, will be described in the following using the drawings. The cell observation system of this embodiment has a imaging section (image sensor) that forms an image of a specimen, with focus position of the imaging section being changed, and focus position of a focus lens is controlled by calculating an AF evaluation value (contrast evaluation value) based on image data from the imaging section (refer, for example, to FIG. 12 which will be described later). The AF evaluation value changes in accordance with focus position of the imaging section, and there are cases where a plurality of peaks (maximum value) occur (refer, for example, to FIG. 8 and FIG. 15). In a case where a plurality of peaks have occurred, for analysis of an image, focus position of the imaging section is controlled to any one of the plurality of peaks (refer, for example, to Q and R in FIG. 8, S93 in FIG. 13, Q' and R' in FIG. 15, and S107 in FIG. 16). Also, in order to observe an image focus position of the imaging section is controlled to an extreme value that is positioned between a plurality of AF evaluation value peaks. There are cases where the focus position of the imaging section is controlled to a minimum value positioned between a plurality of peaks (refer, for example, to P in FIG. 8 and S91 in FIG. 13), and cases where focus position of the imaging section is controlled to a maximum value (peak) positioned between a plurality of peaks (refer, for example, to P' in FIG. 15 and S105 in FIG. 16).

Figure 1:
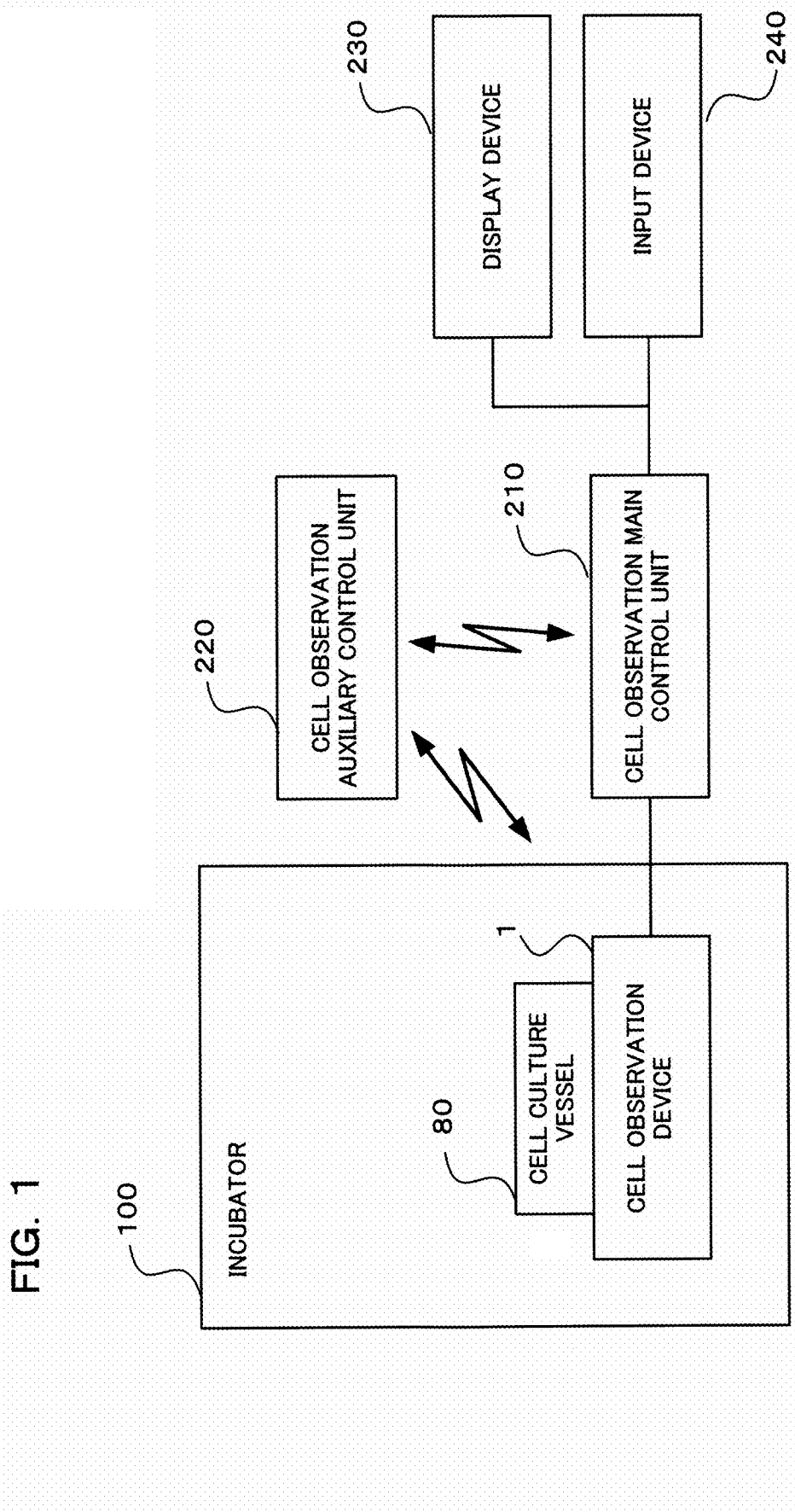
FIG. 1 is a block diagram showing overall structure of a cell observation system of one embodiment of the present invention.

FIG. 1 is a block diagram showing overall structure of a cell observation system. This cell observation system comprises an incubator 100, a cell culture vessel 80, a cell observation device 1, a cell observation main control unit 210, a cell observation auxiliary control unit 220, a display device 230 and an input device 240.

The incubator 100 has a sealed structure, with the inside being subjected to temperature adjustment so as to be kept at a constant temperature (for example, 37.0° C.). The humidity, oxygen concentration and carbon dioxide concentration (for example, 5.0%) may also be kept constant. The cell culture vessel 80 is a bottle or petri dish for cultivation of cells, and has various sizes, shapes and materials. Within the incubator 100, cells are cultivated within the cell culture vessel 80 in an environment where temperature etc. is maintained constant. Shape etc. of the cell culture vessel 80 will be described later using FIG. 4A to FIG. 4C.

A cell observation device 1 is arranged inside the incubator 100, has a camera section (imaging section) 10 (refer to FIG. 2), and observes cells within the cell culture vessel 80. Also, the camera section 10 is capable of movement in the X axis and Y axis direction, as will be described later, and it is possible to change position automatically in accordance with a pattern that has been set beforehand, and to acquire images of cells within the cell culture vessel 80 at the position that has been changed. It should be noted that besides a pattern that has been set, it is also possible for the user to arbitrarily move position of the camera section 10 manually and acquire images of cells. Detailed appearance and electrical structure of this cell observation device 1 will be described later using FIG. 2, FIG. 3A and FIG. 3B.

A cell observation main control unit 210 is a personal computer (PC), for example, is capable of communicating with the cell observation device 1 wirelessly or in a wired manner, and performs overall control of the cell observation device 1. It should be noted that besides a PC, the cell observation main control unit 210 may also be a control device that connects to a server or the like that is connected by an intranet.

A display device 230 and an input device 240 are connected to the cell observation main control unit 210. This connection may be a wired connection, and may be a wireless connection. The display device 230 has a display section such as a monitor, and displays live images that have been acquired by the imaging section of the cell observation device 1 and/or playback images of images that have been stored by the cell observation main control unit 210. Also, menu screens etc. and also screens for various settings such as mode setting are displayed on this display section.

The input device 240 has an input interface such as a keyboard, mouse or touch panel. Using the input device 240, the user performs input of various modes and information etc. such as for the cell culture vessel 80. The input device 240, or the display section 229 of the cell observation auxiliary control unit 220 (refer to FIG. 2), functions as an input section that inputs information of vessels in which specimens are placed (refer, for example, to S9 in FIG. 10, and S41 in FIG. 11, which will be described later). This input section inputs information relating to vessels of a plurality of different shapes (refer, for example, to FIG. 4A to FIG. 4C, S9 in FIG. 10, and S41 in FIG. 11, which will be described later).

The cell observation auxiliary control unit 220 has portability, such as a smartphone or tablet PC, and can perform communication with the cell observation main control unit 210 and/or cell observation device 1 by means of wireless communication (it should be noted that in FIG. 2, that will be described later, a case where communication is performed with the cell observation device 1 is shown), and can perform control of the cell observation system. As wireless communication, as well as wireless communication such as WiFi etc. there may also be infrared communication. If the display section is provided in the cell observation auxiliary control unit 220, it is possible to perform display of live images that have been acquired using the cell observation device 1, and playback display of stored images etc. At least one of the cell observation main control unit 210 and the cell observation auxiliary control unit 220 functions as an external control unit that can communicate with the observation device.

This type of cell observation system of this embodiment has the cell culture vessel 80 arranged within the incubator 100, and acquires image data by imaging cells that are cultivated within this cell culture vessel 80 using the imaging section within the cell observation device 1. This image data that has been acquired is output to the cell observation main control unit 210 and/or the cell observation auxiliary control unit 220, and the image data that has been output is displayed on the display device 230. At the time of observing cells, it becomes possible for the cell culture vessel 80 to cultivate cells in an environment such as constant temperature, without being carried out from the incubator.

Figure 2:
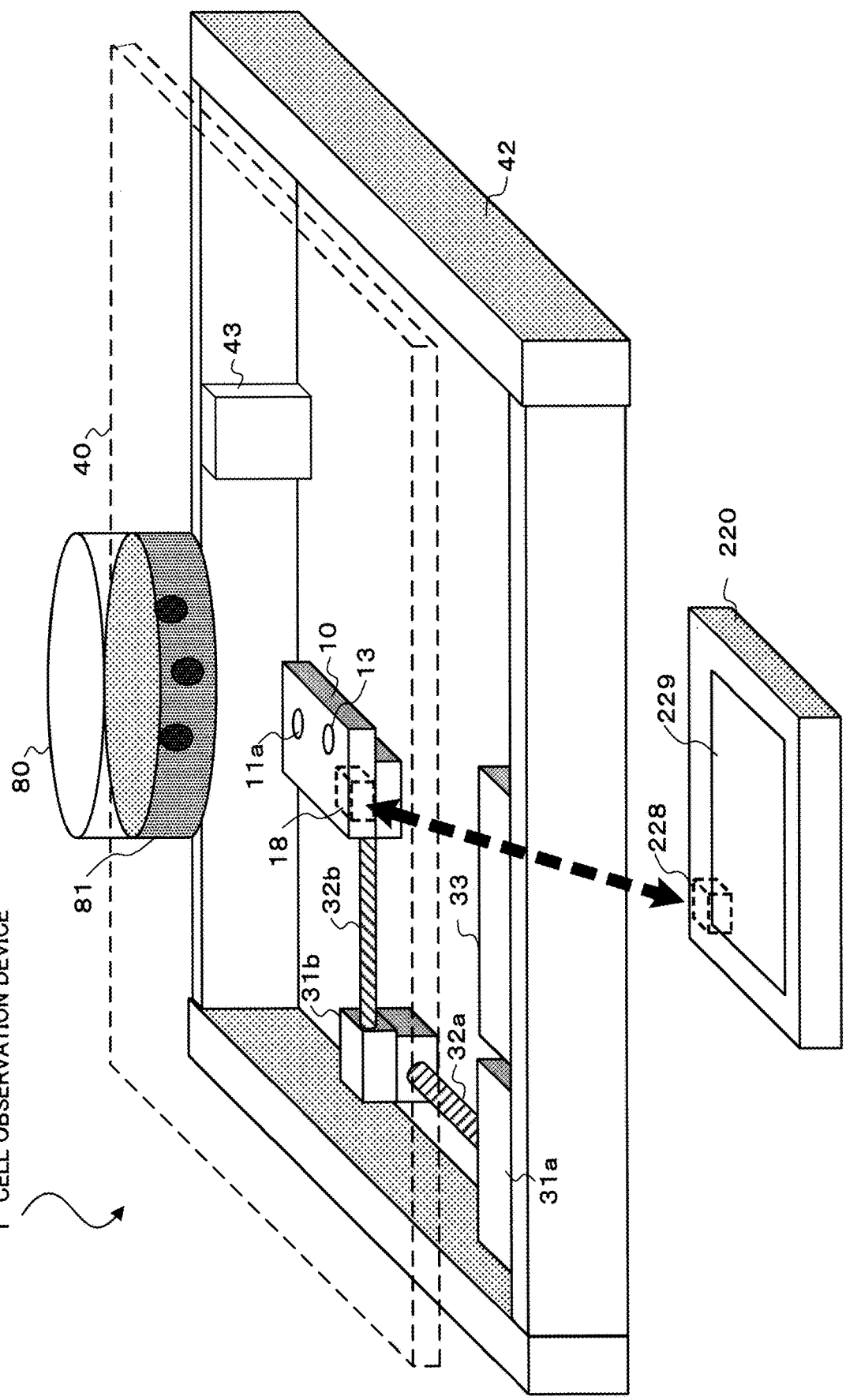
FIG. 2 is an external perspective view showing a cell observation device, vessel, and operating section of one embodiment of the present invention.

Next, the main structure of the cell observation device 1 will be described using the external perspective view shown in FIG. 2. FIG. 2 shows the cell observation device 1, cell culture vessel 80, and cell observation auxiliary control unit 220 within the cell observation system. As was described previously within this cell observation system the cell observation device 1 and the cell culture vessel 80 are arranged within the incubator 100, and the cell observation auxiliary control unit 220 is arranged outside of the incubator 100. It should be noted that this may also apply to the cell observation main control unit 210 instead of the cell observation auxiliary control unit 220.

The cell culture vessel 80 can be mounted on a transparent top board 40 of the cell observation device 1, and the camera 10 can form images of a specimen 81 that has been cultivated in the vessel 80 through the transparent top board 40 and acquire image data of the formed images. This means that cells are cultivated directly within the incubator 100 with an environment maintained, and it is possible to perform measurement and observation of the specimen 81 etc. in the cell observation auxiliary control unit 220 and/or the cell observation main control unit 210 etc. that are outside the incubator 100. Since observation and measurement of the cells that have been cultivated inside the incubator 100 are performed remotely, it is desirable for the cell observation device 1 to have an energy saving and high reliability design.

The cell observation device 1 has a camera section 10, Y actuator 31a, X actuator 31b, Y feed screw 32a, X feed screw 32b, movement control section 33, transparent top board 40, and outer housing 42. The camera section 10 has a lens 11a, with an image that has been formed by the lens 11a being subjected to photoelectric conversion by an image sensor 12a (refer to FIG. 3A) to acquire image data.

An illumination LED 13 is arranged in the camera section 10. Illumination light of the LED 13 is irradiated toward the top board 40 and the cell culture vessel 80, reflected by an upper cover of the cell culture vessel 80, and then the specimen 81 is illuminated by this reflected light passing through. It should be noted that the LED 13 may be arranged above the cell culture vessel 80 and the specimen 81 illuminated by light passing through. Also, an illuminating light source may also use a light source other than LEDs.

A wireless communication device 18 is arranged inside the cell observation device 1. The wireless communication device 18 is capable of wireless communication with a communication section 228 within the cell observation auxiliary control unit 220 that is arranged externally to the cell observation device 1. The detailed structure of the camera section 10 will be described later using FIG. 3A and FIG. 3B.

The camera section 10 is held on an X feed screw 32b, and is capable of moving in the X axis direction by rotation of the X feed screw 32b. The X feed screw 32b is driven to rotate by the X actuator 31b. The Y actuator 31a is held on an outer housing 42, and is capable of movement in the Y axis direction by rotation of the Y feed screw 32a. The Y feed screw 32a is driven to rotate by the Y actuator 31a.

A movement control section 33 controls drive of the Y actuator 31a and the X actuator 31b, and controls drive of the camera section 10 in the X axis and Y axis directions in accordance with a procedure that has been preprogrammed. Also, it is possible for the user to move the camera section 10 to a particular position, and in this case, since a manual operation is instructed by the cell observation auxiliary control unit 220, the movement control section 33 moves the camera section 10 in accordance with the user's instruction. The movement control section 33, Y actuator 31a, X actuator 31b etc. function as an imaging position change section that changes imaging position of the imaging section.

It should be noted that, as will be described later, a built-in power supply battery 73 is provided inside the cell observation device 1, and the power supply battery 73 supplies power to the movement control section 33, Y actuator 31a, X actuator 31b and camera section 10. Also, communication lines for bidirectional communication of control signals are provided between each of the sections within the cell observation device 1. With this embodiment it is assumed that a power supply battery is used as the power supply in order to simplify arrangement of the cell observation device 1 within the incubator, but this is not limiting, and supply of power may also be performed using an AC power supply. It is also assumed that control signals between each of the sections are interchanged by means of wired communication, but it is also possible to use wireless communication.

The above described camera section 10, Y actuator 31a, X actuator 31b, Y feed screw 32a, X feed screw 32b, and movement control section 33 are arranged inside a housing that is made up of a top board 40 and an outer housing 42. The top board 40 and outer housing 42 constitute an encapsulating structure such that moisture does not infiltrate into the inside from outside. As a result the inside of the housing constituted by the top board 40 and the outer housing 42 are not subjected to high humidity, even if the inside of the incubator 100 is high humidity.

A device interior temperature sensor 43a (refer to FIG. 3A) is arranged as a built-in sensor 43 inside the housing that is constituted by the top board 40 and outer housing 42. As the built in sensor 43, in this embodiment there is a temperature sensor 43a for detecting temperature inside the cell observation device, but this is not limiting and it is also possible to have a pressure sensor for detecting pressure, a humidity sensor for detecting humidity, etc. Besides the temperature sensor, there may be only one of a pressure sensor and a humidity sensor, and a sensor for detecting another parameter may also be arranged. Also, arrangement position does not need to be at a single location, and the sensors may be arranged suitably dispersed.

It should be noted that external sensors may also be arranged outside the housing that is made up of the top board 40 and the outer housing 42. As the external sensors there are a temperature sensor for detecting temperature outside the cell observation device 1, a pressure sensor for detecting pressure, a humidity sensor for detecting humidity, an oxygen concentration sensor for detecting oxygen concentration, a nitrogen concentration sensor for detecting nitrogen concentration, a carbon dioxide concentration sensor for detecting carbon dioxide concentration, etc. There may be one or a plurality of any of these sensors, and sensors for detecting other items may also be arranged. Also, arrangement position does not need to be at a single location, and the sensors may be arranged suitably dispersed.

It is possible to mount the cell culture vessel 80 on the upper side of the transparent top board 40, and it is possible to fill a culture medium into the inside of the container 50 and cultivate a specimen 81 (cells). The lens 11a of the camera section 10 forms images of the culture medium inside the cell culture vessel 80 through the transparent top board 40, and it is possible for the user to observe the images that have been formed. At the time of this image forming the specimen 81 is illuminated by the LED 13, as was described previously. Since images of the cells within the cell culture vessel 80 are formed by the camera 10, the bottom surface of the cell culture vessel 80 (side in contact with the top board 40) is preferable transparent.

The cell observation auxiliary control unit 220 has a communication section 228, and is capable of wireless communication with the wireless communication device 18 within the cell observation device 1. This means that it is possible for the cell observation auxiliary control unit 220 to perform communication with the camera section 10 at a position that is remote from the cell observation device 1, and it is possible to move the camera section 10 and to receive image data that has been acquired by the camera section 10. It should be noted that the cell observation auxiliary control unit 220 may be a dedicated unit, but an information terminal device such as a smartphone may also double as an operation section. Further, the cell observation auxiliary control unit 220 may utilize an operation section that belongs to a computer such as a personal computer (PC) or a server.

Also, the cell observation auxiliary control unit 220 can count a number cells and detect cell density of the specimen 81 by analyzing images that have been formed. Specifically, position of the camera section 10 is moved using the X actuator 31b and the Y actuator 31a, and an image of the specimen 81 within the cell culture vessel 80 is formed. The cell observation auxiliary control unit 220 can count the number of cells and detect cell density based on images that have been formed. It should be noted that counting of cells etc. and detection of cell density may also be informed by the cell observation main control unit 210. Also, an image processing section 63 (referred to FIG. 3B) within the cell observation device 1 may perform counting of cells etc. and detection of cell density. Results of counting cells etc. and detecting cell density by the image processing section 63 are transmitted to the cell observation main control unit 210 and the cell observation auxiliary control unit 220. Methods for counting the number of cells and detecting cell density will be described later using FIG. 14A and FIG. 14B.

The cell observation auxiliary control unit 220 may also have a display section 229, and in this case the display section 229 performs display of various modes of the cell observation auxiliary control unit 220 and icons etc. for various settings. If a touch panel is provided on the display section 229, it is possible to perform various inputs using a touch operation. The display section 229 also displays images that have been acquired and transmitted by the camera section 10.

Figure 3A:
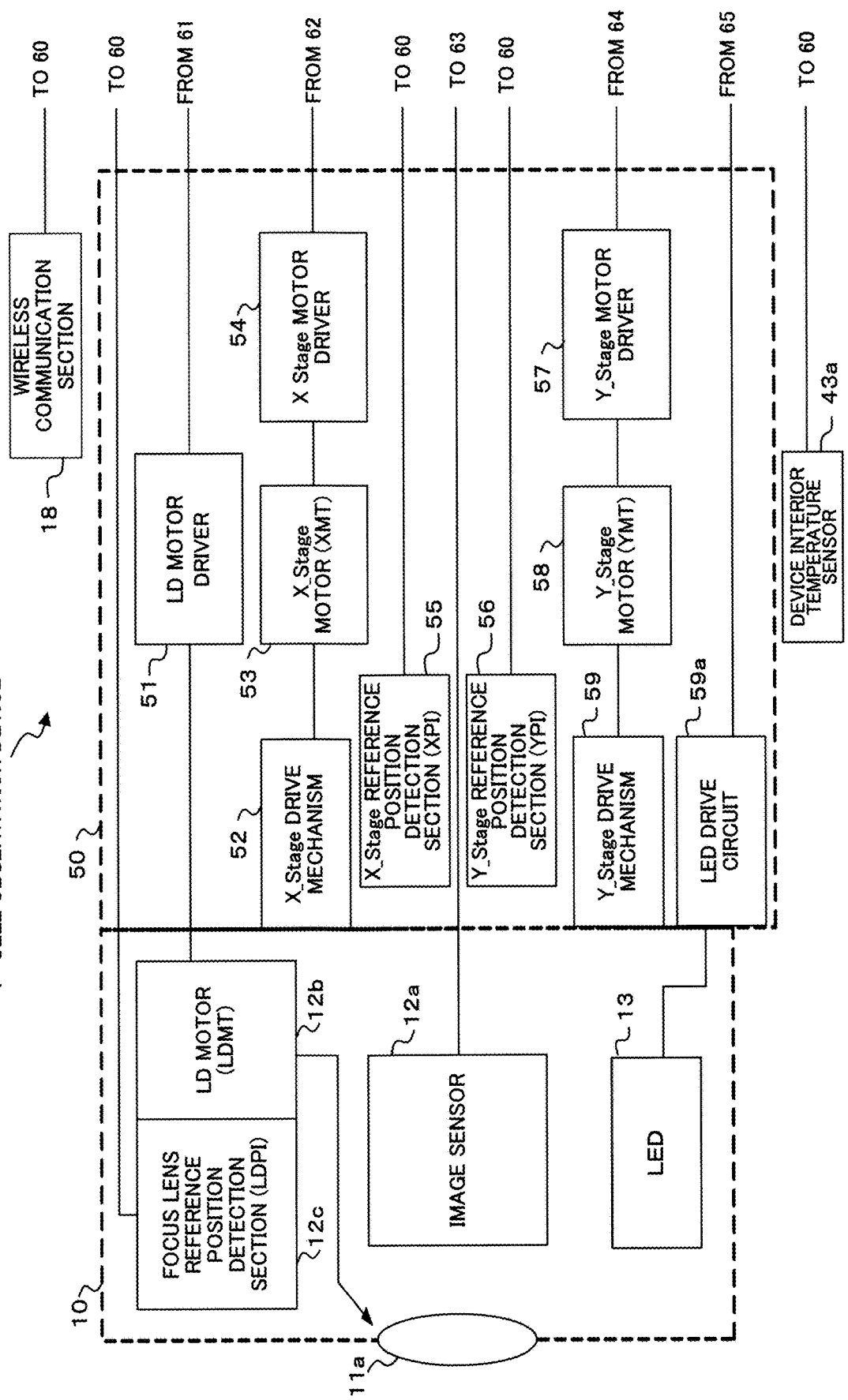
FIG. 3A and FIG. 3B are block diagrams mainly showing the electrical structure of a cell observation device of one embodiment of the present invention.
Figure 3B:
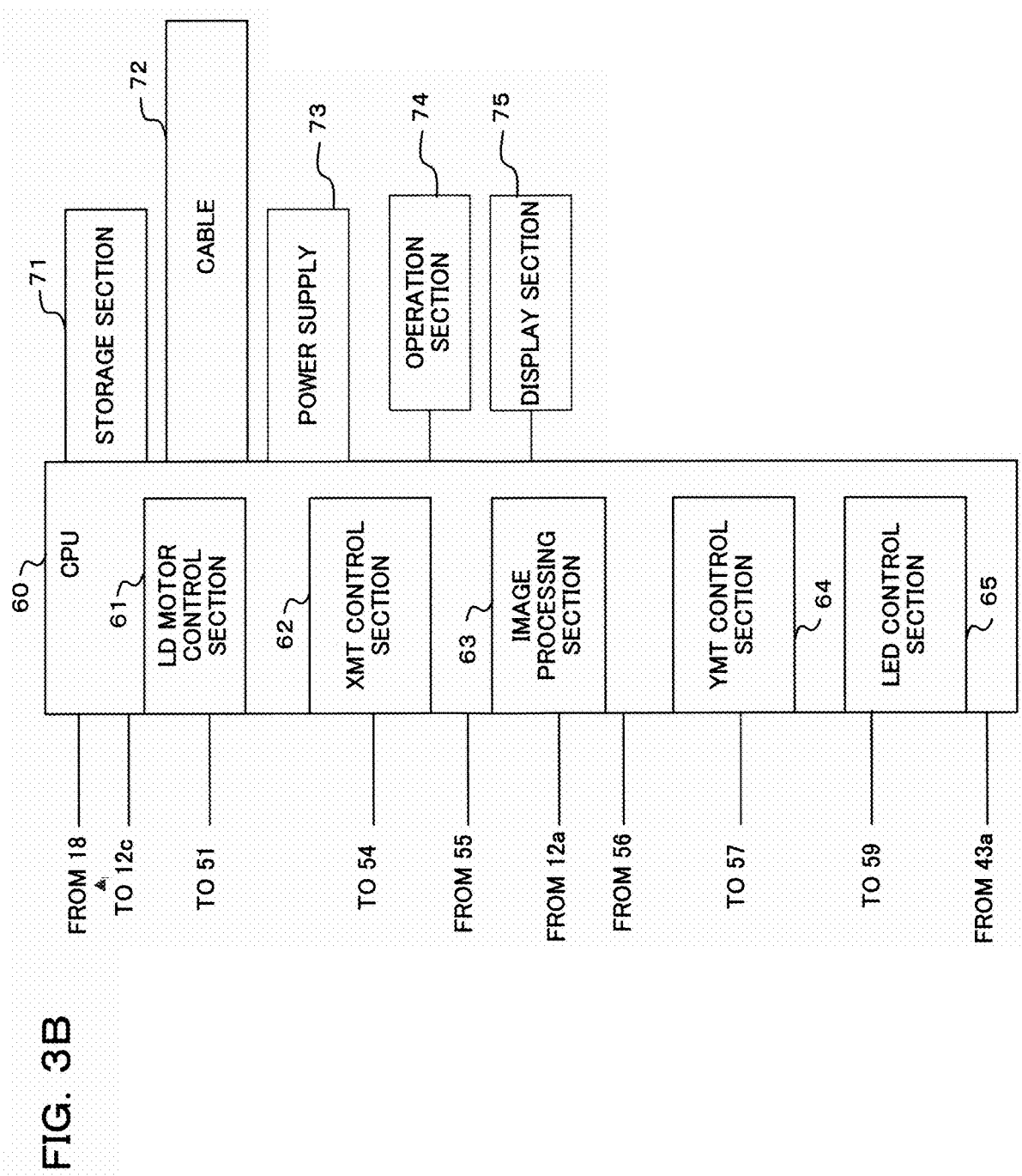

Next, the electrical structure of the cell observation device 1 of this embodiment will mainly be described using FIG. 3A and FIG. 3B. The cell observation device 1 has the camera section 10, X/Y stage section 50, CPU (Central Processing Unit) 60, device interior temperature sensor 43a, and other peripheral circuits etc.

There is a photographing lens that includes a focus lens 11a within the camera section 10. The photographing lens that includes this focus lens 11a is a prime lens or a zoom lens, and forms images of the specimen 81, such as cells etc., on the image sensor 12a. The photographing lens may also be an entire group extending type with which all groups of a lens formed for focusing are moved integrally in an optical axis direction. While FIG. 2 does not show an aperture and mechanical shutter on the optical axis of the focus lens 11a, these components may be provided, or they may be omitted.

The image sensor 12a is an image sensor such as a CCD image sensor or a CMOS image sensor, and generates an image signal by subjecting an image that has been formed by the focus lens 11a to photoelectric conversion. This image signal is subjected to processing such as A/D conversion in an imaging circuit to generate image data, and this image data is output to an image processing section 63. The image sensor 12a functions as an image sensor (imaging section) that forms images of the specimen. The image sensor (imaging section) is capable of imaging corresponding to still images, imaging corresponding to live view, and imaging corresponding to movies.

The focus lens 11a is moved in the optical axis direction of the focus lens 11a by a lens drive (LD) motor (LDM) 12b. The LD motor 12b is a stepping motor in this embodiment, but may be another type of motor.

A focus lens reference position detection section (LDPI) 12c has a photo interrupter or the like, and outputs a reference position signal to the CPU 60 when the focus lens 11a reaches a reference position. It is possible to detect position of the focus lens 11a based on a number of pulses that have been applied to the stepping motor from the point in time when this reference position signal has been output. Based on this position detection an LD motor control section 61 can move the focus lens 11a to a focus position that is made a target position. It should be noted that in the case of a motor other than a stepping motor, a sensor may be provided to detect relative or absolute position of the focus lens 11a.

As was described previously, the LED (Light Emitting Diode) 13 is a light source for illuminating cells (specimen 81) within the cell culture vessel 80. Emission wavelength of the LED may be set to red light that does not damage the cells (specimen 81), and more specifically may be set to red light having a wavelength of 660 nm. It should be noted that there may also be an illumination light source other than the LED.

The X/Y stage section 50 is a mechanism for moving position of the camera section 10 in the X direction and Y direction, and is equivalent to the Y actuator 31a, X actuator 31b, movement control section 33 etc. of FIG. 1.

An LD motor driver 51 is a drive circuit for the LD motor 12b, and outputs drive pulses for the LD motor 12b in accordance with a control signal from the LD motor control section 61 within the CPU 60. The above-described LD motor 12b and the LD motor driver 51, and the LD motor control section 61 which will be described later, function as a focus section that controls focusing of the imaging section. Also, the above described LD motor 12b, LD motor driver 51, and LD motor control section 61 function as a focus control circuit that controls focusing of the imaging section. The focus control section is capable of adjusting focus such that contrast becomes a peak, based on image information that was formed by the imaging section.

An X stage drive mechanism 52 is a mechanism for driving the camera section 10 in the X axis direction, and is equivalent to the X feed screw 32b in FIG. 2. It should be noted that the X stage drive mechanism 52, besides being a feed screw mechanism, may be a mechanism for causing the camera section 10 to move spatially in the X axis direction, such as a gear mechanism or a belt mechanism or the like.

An X stage motor (XMT) 53 is a motor for causing rotation of the X feed screw 32b, and in this embodiment a stepping motor is adopted. The X stage motor 53 is equivalent to the X actuator 31b in FIG. 2. The X stage motor 53 is pulse driven by an X stage motor driver 54. The X stage motor driver 54 performs drive control of the X stage motor 53 in accordance with a control signal from an XMT control section 62 within the CPU 60.

An X stage reference position detection section 55 has a detection sensor such as a PI (photo interrupter) or PR (photo reflector), and outputs a reference signal to the CPU 60 when the camera section 10 has reached a reference position in the X axis direction. The XMT control section 62 can move the camera section 10 to a target position in the X axis direction by applying pulses to the X stage motor 53 on the basis of this reference position.

A Y stage drive mechanism 59 is a mechanism for driving the camera section 10 in the Y axis direction, and is equivalent to the Y feed screw 32a in FIG. 2. It should be noted that the Y stage drive mechanism 59, besides being a feed screw mechanism, may be a mechanism for causing the camera section 10 to move spatially in the Y axis direction, such as a gear mechanism or a belt mechanism or the like.

A Y stage motor (YMT) 58 is a motor for causing rotation of the Y feed screw 32a, and in this embodiment a stepping motor is adopted. The Y stage motor 58 is equivalent to the Y actuator 32a in FIG. 2. The Y stage motor 58 is pulse driven by a Y stage motor driver 57. The Y stage motor driver 57 performs drive control of the Y stage motor 58 in accordance with a control signal from a YMT control section 64 within the CPU 60.

A Y stage reference position detection section 56 has a detection sensor such as a PI (photo interrupter) or PR (photo reflector), and outputs a reference signal to the CPU 60 when the camera section 10 has reached a reference position in the Y axis direction. The YMT control section 64 can move the camera section 10 to a target position in the Y axis direction by applying pulses to the Y stage motor 58 on the basis of this reference position.

An LED drive circuit 59a performs lighting control for the LED 13 in accordance with a control signal from an LED control section 65 within the CPU 60.

The CPU (Central Processing Unit) 60 controls each section within the cell observation device 1 in accordance with programs stored in a storage section 71. The CPU 60 functions as a controller (processor), and the CPU 60 is arranged as part of a so-call ASIC (Application Specific Integrated Circuit). Within this ASIC, besides the CPU 60 there are peripheral circuits, and functions of the lens drive (LD) motor control section 61, X motor (XMT) control section 62, image processing section 63, Y motor (YMT) control section 64, and LED control section 65 are realized by the CPU and peripheral circuits within the ASIC. Each of these sections is realized in a software manner using a program, but some functions of each of the control sections 61, 62, 64 and 65 and/or the image processing section 63 etc. may be realized using peripheral circuits etc. The CPU 60 functions as a processor having a focus control section and an analyzer.

Figure 12:
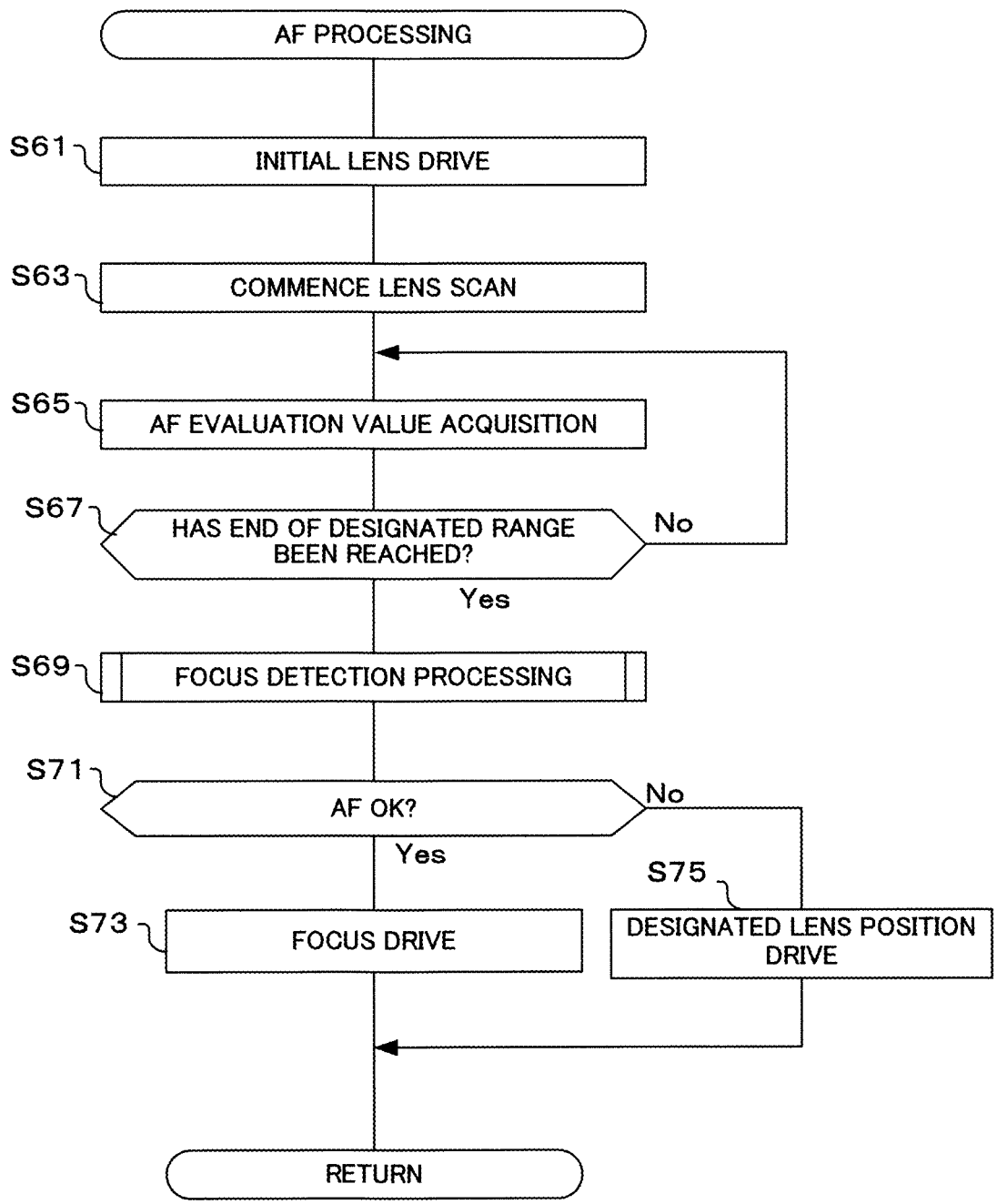
FIG. 12 is a flowchart showing AF processing of an imaging section within the cell observation device of one embodiment of the present invention.

The above described controller functions as a focus control section that causes change in focus position of the image sensor (imaging section), calculates a contrast evaluation value based on image data output by the image sensor (imaging section), and controls focus based on the contrast evaluation value (refer, for example, to FIG. 12). This focus control section, in a case where image data for analysis of the specimen by the analyzer is obtained when a plurality of maximum values have been generated for change in contrast evaluation value corresponding to change in the focus position, controls focus position to any focus position that corresponds to the plurality of maximum values, and the image sensor outputs image data that has been imaged (refer, for example, to Q and R in FIG. 8, and S87, S89 and S93 in FIG. 13).

Figure 13:
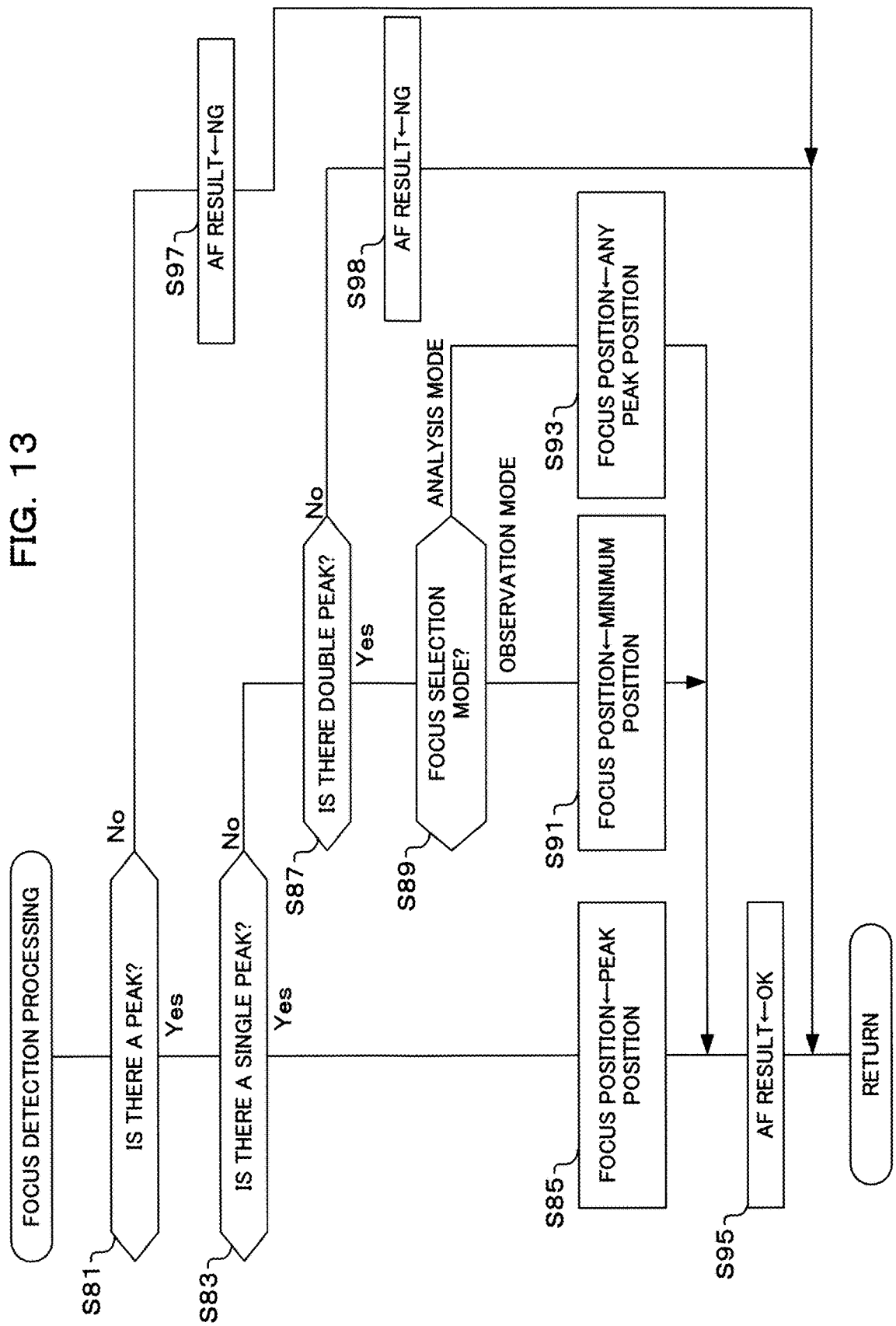
FIG. 13 is a flowchart showing focus detection processing of an imaging section within the cell observation device of one embodiment of the present invention.

Also, when image data for observation is generated by the image processing circuit (observation image data generating section), if a plurality of maximum values appear with change in contrast value corresponding to change in focus position, the focus control section controls focus position to a position corresponding to an extreme value of contrast evaluation value that is positioned between focus positions corresponding to the plurality of maximum values (refer, for example, to S87, S89 and S93 in FIG. 13, S101, S103 and S107 in FIG. 16 etc.). Also, the above-described focus control section may control to a focus position corresponding to any among the extreme values for contrast evaluation value that are positioned between the focus positions corresponding to the plurality of maximum values.

The above-described focus control section also controls focus position to a focused position corresponding to one maximum value, in the event that one maximum value is generated with change in contrast evaluation value corresponding to change in focus position (refer, for example, to S83 Yes and S85 in FIG. 13).

The LD motor control section 61 has a motor control circuit, and focusing of the focus lens 11a is controlled by performing drive control of the lens drive (LD) motor 12b (refer to S25 in FIG. 10 and to FIG. 12, which will be described later). The XMT control section 62 controls position of the camera section 10 in the X axis direction by controlling drive of the X stage motor 53. The YMT control section 64 controls position of the camera section 10 in the Y axis direction by controlling drive of the Y stage motor 58 (refer to S13 in FIG. 10, which will be described later).

The image processing section 63 has an image processing circuit, and processes image data from the image sensor 12*a*, performs image display on the display section 75, and displays images of the specimen 81 etc. on an external display section (for example, the display section 229 of the cell observation auxiliary control section 220) via a communication cable within the cable 72. The image processing section 63 may also perform image analysis such as counting a number of specified cells within the specimen 81, detecting density of cells, and measuring shape of cells. Further, the image processing section 63 calculates an AF (Auto Focus) evaluation value based on image data.

The image processing circuit of the image processing section 63 functions as an image processing circuit that generates observation image data for performing observation based on image data output by the image sensor (imaging section). The image processing section 63 functions as an analyzer that analyzes a specimen based on image data output by the image sensor (imaging section). This analyzer counts a number of cells that are contained in the specimen (refer, for example, to FIG. 14A). This analyzer measures shape of cells that are contained in the specimen. This analyzer measures density of cells that are contained in the specimen (refer, for example, to FIG. 14B).

The LED control section 65 performs light emission control of the LED 13 using the LED drive circuit 59*a*. This light emission control is control of light emission at the time of imaging the specimen 81 such that illumination of the specimen 81 results in an appropriate exposure.

The storage section 71 has electrically rewritable volatile memory and/or electrically rewritable non-volatile memory. Besides the previously described programs, the storage section 71 may also store various adjustment values for the cell observation device 1, and may also store a predetermined movement path (movement pattern) for the camera section 10 at the time of cell observation. That is, a designated position for performing still picture shooting, and shooting conditions at this designated position, are set and stored in the storage section 71.

The cable 72 is a communication cable for when connecting between the cell observation device 1 and the cell observation auxiliary control section 220 in a wired manner. Image data that has been acquired by the image sensor 12*a* is transmitted externally by means of this communication cable. In the case of wireless communication, this communication cable may be omitted. The cable 72 is also a power supply cable in the case of supplying power to the cell observation device 1 from outside. In the event that a power supply battery is built into the cell observation device 1, the cable may be omitted. A power supply section 73 receives supply of power from outside by means of the cable 72 or using the built-in battery, and converts to a power supply voltage for use by the cell observation device 1.

An operation section 74 has switches for performing on-off control of the power supply for the cell observation device 1, and on-off control of communication with the cell observation auxiliary control section 220 using wireless communication etc. Besides this, the operation section 74 may also include switches, a dial or a touch panel etc. for performing some operations using the cell observation auxiliary control section 220. The display section 75 has a display, and displays images of the specimen 81 etc., that have been processed by the image processing section 63 of the CPU 60. It should be noted that the display section 75 may be omitted and images displayed only on an external unit.

The device interior temperature sensor 43*a* detects temperature inside the housing that is made up of the top board 40 and the outer housing 42 of the cell observation device 1, and outputs the detected temperature to the CPU 60. The device interior temperature sensor 43*a* functions as a temperature measurement section that measures temperature inside the observation device. The device interior temperature sensor 43*a* is arranged at only a single location in FIG. 2, but a plurality of sensors may be arranged at different positions inside the housing that is made up of the top board 40 and the outer housing 42. In this case, a control section may estimate the temperature of the specimen 81 based on output of the plurality of temperature sensors, and decide on a temperature to be measured.

The cell observation device 1 of this embodiment has the X stage drive mechanism 52 and the Y stage drive mechanism 59, and it is possible to move the camera section 10 that includes the image sensor 12*a* in the X axis direction and the Y axis direction using these drive mechanisms.

Also, the cell observation device 1 of this embodiment has the image sensor 12*a*, and it is possible to acquire images of the cells (specimen 81) at desired positions. It is possible to perform live view display using these acquired images, and it is also possible to store acquired images as still images or movies, and play back stored images later. Also, by analyzing the images that have been acquired it is also possible to perform various analysis, such as counting of the number of cells.

Also, the image processing section 63 of the cell observation device 1 of this embodiment calculates AF evaluation value of image data that has been acquired by the image sensor 12*a*, and causes the focus lens 11*a* to be moved to an in focus position using the LD motor 12*b*, based on this AF evaluation value that has been calculated. Details of drive to the in focus position will be described later using FIG. 5A to FIG. 8.

Figure 4A:
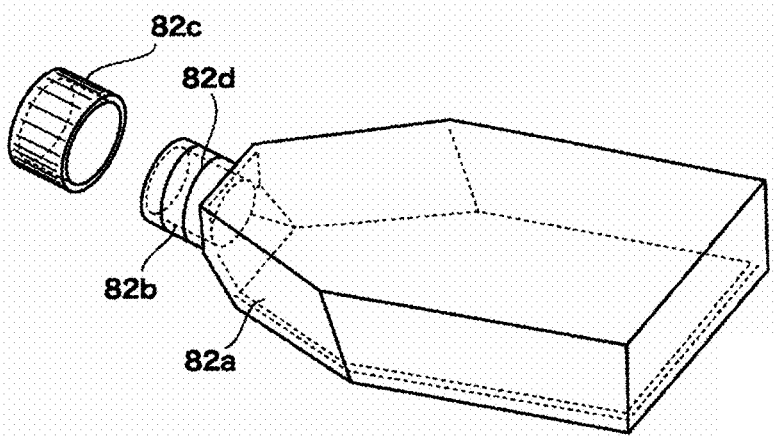
FIG. 4A to FIG. 4C are external perspective views showing one example of a vessel for holding cells, in a cell observation system of one embodiment of the present invention.

Next, examples of the cell culture vessel 80 will be described using FIG. 4A to FIG. 4C. FIG. 4A shows an example of a flask shaped vessel disclosed in Japanese patent laid-open No. 2013-116073. With this example, the inside of the vessel main body section 82*a* is a cavity, and a locking section 82*d* that locks a lid 82*c* is formed on a neck section 82*b* that continues to this cavity. A culture medium is held inside the vessel main body section 82*a*, and cells can be cultivated.

Figure 4B:
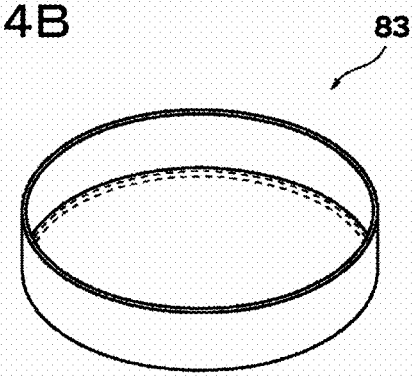

FIG. 4B shows an example of a dish-shaped vessel 83. This vessel 83 has a wall section formed around a bottom section, and the upper part is formed open. A standard size for the diameter is 100 mm, but various sizes are available.

Figure 4C:
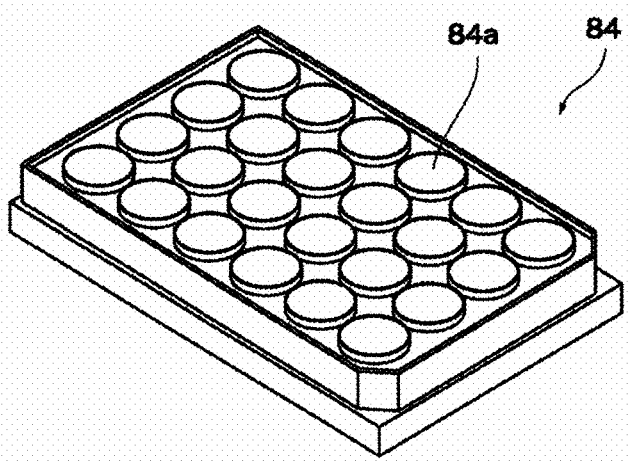

FIG. 4C shows an example of a well (micro) plate shaped vessel 84 that is disclosed in Japanese patent laid-open No. 2014-506799. With this example, 4×6=24 small cavities 84*a* are provided, and cells are cultivated by placing respective culture mediums in each indent 84*a*. The example shown in FIG. 4C is a 24 well type vessel, but as well as this type there are vessels of varying well numbers, such 6 wells and 12 wells.

Figure 5A:
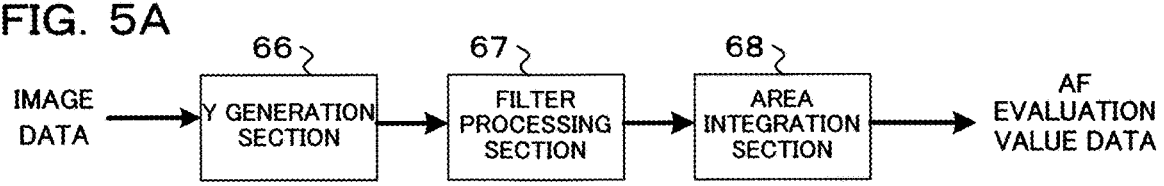
FIG. 5A and FIG. 5B are a block diagram for AF evaluation value calculation and a block diagram showing a structural example of a filter processing section, in the cell observation system of one embodiment of the present invention.

Next, calculation of AF evaluation value will be described using FIG. 5A and FIG. 5B. FIG. 5A shows a structure for calculating AF evaluation value that has been provided within the image processing section 63.

A Y generation section 66 includes a brightness generating circuit for a brightness signal (Y signal), is input with image data (RGB data) from the image sensor 12a, generates brightness data, and outputs the brightness data to a filter processing section 67. The filter processing section 67 includes a filter circuit, and extracts high-frequency components formed within the brightness data for output to an area integration section 68. Detailed circuits of the filter processing section 67 will be described later using FIG. 5B.

The area integration section 68 includes an addition circuit, or includes addition processing that uses software using the CPU 60, and integrates high-frequency components of image data for a single frame that have been output from the filter processing section 67. High-frequency components that have been integrated by the area integration section 68 are generated as AF evaluation value data (contrast valuation data). It should be noted that the area integration section 68 may integrate all high-frequency components of a single frame of image data of the image sensor 12a, and may integrate high-frequency components of image data of a specified focus adjustment range that has been automatically or manually set in advance.

Figure 5B:
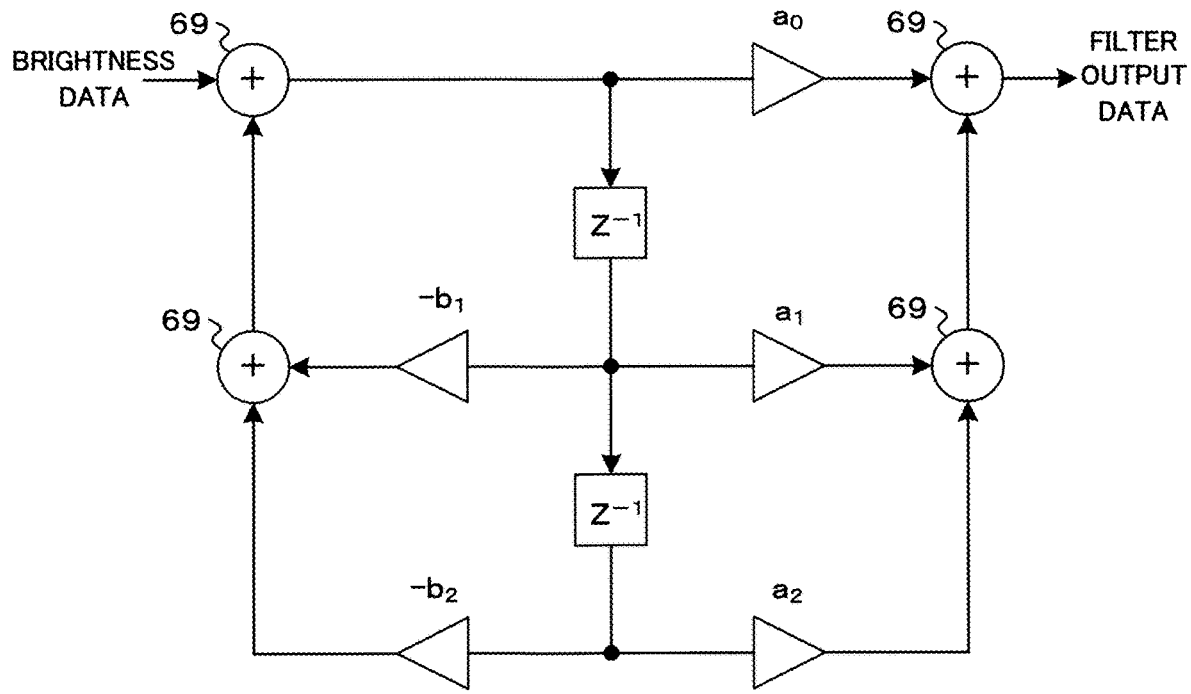

FIG. 5B shows one example of a filter processing circuit of the filter processing section 67. The filter processing circuit shown in FIG. 5B has an adder 69, amplifiers a0, a1, a2, −b1 and −b2, and delay circuits $Z^{-1}$, and this filter processing circuit extracts high-frequency components for brightness data that has been input, and generates filter output data.

Figure 6:
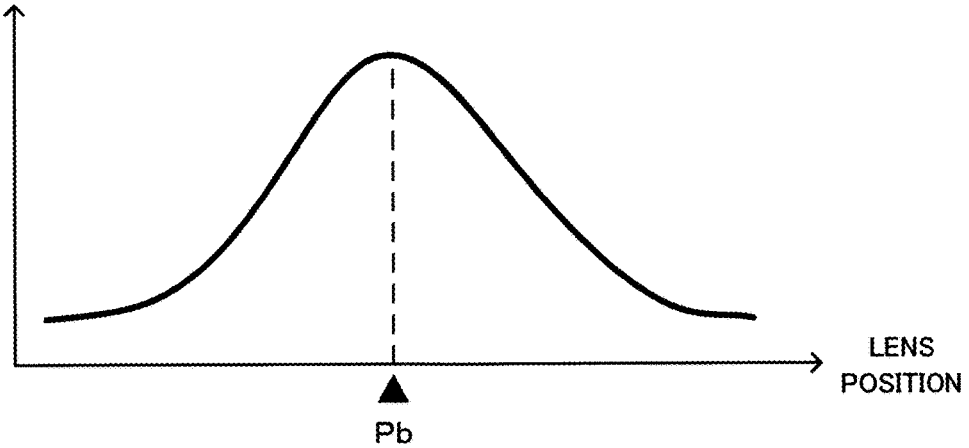
FIG. 6 is a graph showing an example of a relationship between lens position and AF evaluation value for the imaging section (in a case where there is a single peak), in the cell observation system of one embodiment of the present invention.

FIG. 6 shows one example of change in AF evaluation value when focus lens position has been moved, with focus lens position being shown in the horizontal axis and AF evaluation value (contrast value) being shown on the vertical axis. Specifically, AF evaluation value for each lens position is shown, in a case where the focus lens 11a has been moved in the optical axis direction by the LD motor 12b. Lens position Pb is a position where AF evaluation value becomes maximum, namely a best focus position, and is a position where the focus lens 11a is focused on the specimen 81.

Next, a case where AF evaluation value has two peaks (double peak) will be described using FIG. 7. The dashed lines show a light path for illuminating light L, and as was described previously, irradiated light of the LED 13 is reflected by a cover of the cell culture vessel 80, and the reflected light, namely the illuminating light L, is irradiated into cells 81a, which are a specimen, in a substantially parallel manner. This illumination light L that has been irradiated passes through the cells 81a and the bottom surface 8a of the cell culture vessel 80. When the illumination light L passes through the cells 81a, since the shape of the cells 81a is a projecting shape, a light beam is refracted and a light condensing effect is produced. Therefore, when the illumination light L that has passed through the cells 81a forms an image on an imaging surface by means of the imaging optical system (photographing lens 11a), if there is deviation from the focus position sparseness and density (light beam disparity) will arise in the light beam, and sparse portions (dark portions) and dense portions (bright portions) will occur in the image of the specimen.

For light beams that have passed through the cells 81a and the focus lens 11a, as the imaging optical system, at an imaging surface position (r) light beams close to cell boundaries become dense, and as a result the vicinity of a cell boundary becomes bright. At an imaging surface position (p) light beam density becomes uniform, and as a result an observation image of a cell becomes distinct and easy to visually recognize. At an imaging surface position q, light beams of a cell boundary become sparse, and as a result the vicinity of a cell boundary becomes dark.

Figure 9A:
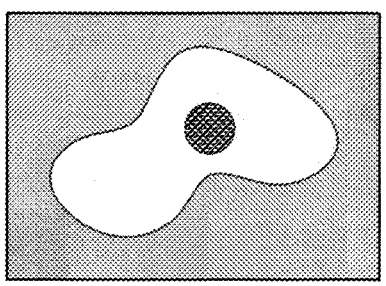
FIG. 9A to FIG. 9C are drawings showing examples of taken images, in a cell observation system of one embodiment of the present invention.
Figure 9B:
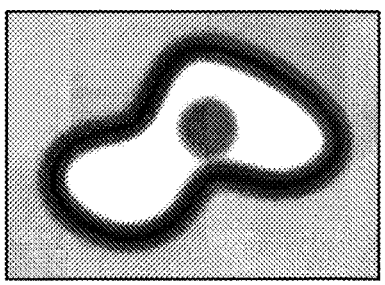
Figure 9C:
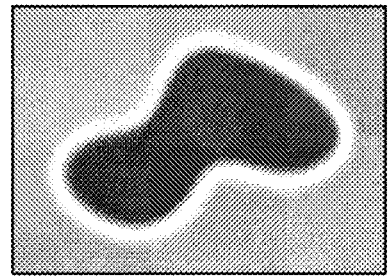

As has been described above, sparseness and density of light beams in the vicinity of a cell boundary differs depending on the imaging surface position. As result in an image of the cells 81a at imaging surface position (r) boundaries of the cells 81a become white and inner portions become black, as shown in FIG. 9C. Also, an image of the cells 81a at imaging surface position (p) becomes a focused image, as shown in FIG. 9A. Also in an image of the cells 81a at imaging surface position (q) boundaries of the cells 81a become black and inner portions become white, as shown in FIG. 9B. It should be noted that 81B shows an image of the cells 81a at imaging surface position (p). It should also be noted that a portion where intersecting diagonals have been applied in cells 81a shows a nucleus of a cell.

Figure 7:
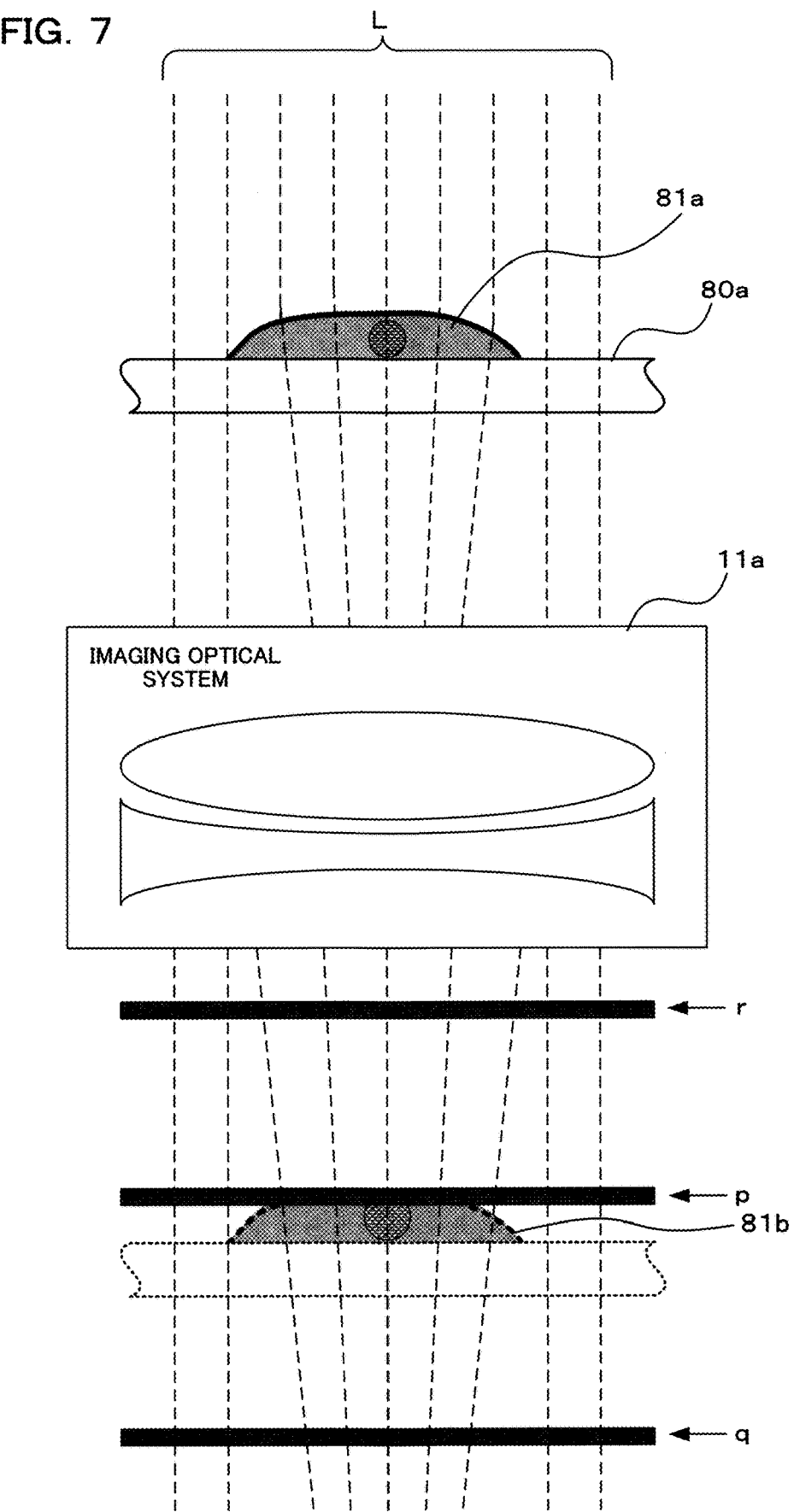
FIG. 7 is a drawing showing light beams generated by an imaging optical system of the imaging section, in the cell observation system of one embodiment of the present invention.
Figure 8:
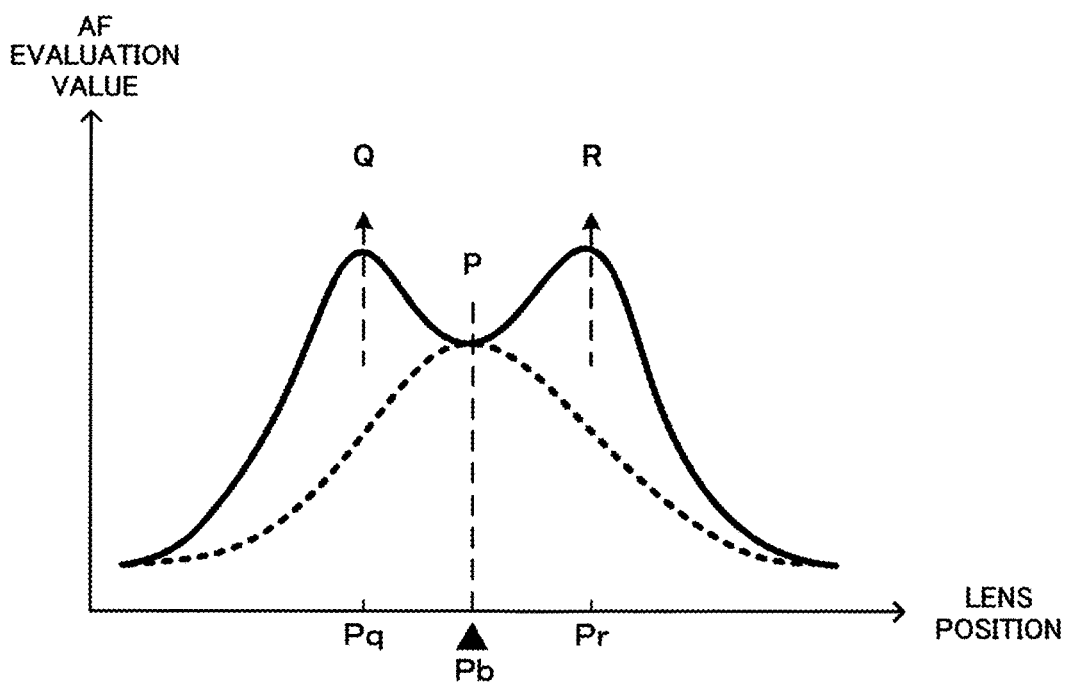
FIG. 8 is a graph showing an example of a relationship between lens position and AF evaluation value for the imaging section (in a case where there are two peaks), in the cell observation system of one embodiment of the present invention.

FIG. 8 shows change in AF evaluation value for a case where sparseness and density have occurred in transmitted light flux due to a light condensing effect caused by the projecting shape of the cells 81a, as shown in FIG. 7. In FIG. 8, the line shown by a dashed line shows change in AF evaluation value for a case where there is no light condensing effect, and this is the same as change in AF evaluation value that was shown in FIG. 6.

In FIG. 8, the line shown by a solid line shows change in AF evaluation value for a case where there is a light condensing effect. At lens position Pq and lens position Pr of the focus lens 11a, AF evaluation value becomes a maximum value, and at the best focus position Pb the AF evaluation value becomes a minimum value.

Examples of taken images for each imaging surface are shown in FIG. 9A to FIG. 9C. A taken image at the best focus position Pb (corresponding to position p in FIG. 7) is the image shown in previously described FIG. 9A, and is suitable for observing cells 81a that are in focus.

A taken image at lens position Pq (corresponding to position q in FIG. 7) is the image shown in previously described FIG. 9B, in which a boundary of a cell 81a is black and the inside of a cell is white. For example, as a method for counting a number of cells, there is a method of counting by detecting peripheral parts of cells from an image to determine the existence of cells. The image shown in FIG. 9B is an image that is suitable for counting a number of cells, if this method is adopted. Also, as a method for measuring density of cells, there is also a method that detects peripheral parts of cells from images to determine the existence of cells, and measures surface area inside the peripheral parts to measure density of cells. The image shown in FIG. 9B is a suitable image in this case also.

A taken image at lens position Pr (corresponding to position r in FIG. 7) is the image shown in previously described FIG. 9C, in which a boundary of a cell 81a is white and the inside of a cell is black. For example, as a method for measuring density of cells, there is a method of determining from an image that a portion that has a white boundary a black inside is a cell, and measuring density of cells based on surface area of the portion that is black inside. The image in FIG. 9C is an image that is suitable in a case where this method is adopted. Also, as a method for counting a number of cells, there is a method of detecting the existence of cells by determining from an image that a portion having a white boundary and being black inside is a cell. In a case where this method is adopted, the image of FIG. 9C is an image that is suitable for counting a number of cells.

Next, operation of the cell observation device 1 will be described using the flowchart shown in FIG. 10. This flowchart (the same applies to FIG. 12. FIG. 13 and FIG. 16 which will be described later) is implemented by the CPU 60 controlling each of the sections within the cell observation device 1 in accordance with program code that has been stored within the storage section 71. In this flowchart, description will be given for when the user controls the cell observation device 1 using the cell observation auxiliary control unit 220. However, the cell observation device 1 may also be controlled using the cell observation main control unit 210.

If the flowchart for imaging section communication shown in FIG. 10 is commenced by a power supply being switched on or the like, first a communication stand by state is entered (S1). Here, commencement of communication from the cell observation auxiliary control section 220 is awaited. Specifically, in a case where the user issues instructions to the cell observation device 1 that has been arranged in a room that is isolated from the cell observation auxiliary control section 220, such as an incubator 100, the cell observation auxiliary control section 220 is operated. This step is a state of awaiting receipt of a control signal based on this operation, using wireless communication.

Next, it is determined whether or not power supply on/off communication has been performed (S3). As was described previously, with this embodiment power supply for the cell observation device 1 is supplied using a battery, and so in order to prevent consumption of the power supply battery it is possible for the user to perform a power supply on or power supply off instruction from the cell observation auxiliary control section 220. It should be noted that as well as a built-in power supply battery, in a case where the cell observation device 1 is supplied with power from outside, the processing of this step S3 and S5 may be omitted.

If the result of determination in step S3 is that there has been power supply on/off communication, imaging on/off processing is performed (S5). Here, in the event that the power supply is on, power supply to each section of the CPU 60, and to the camera section 10 and the X/Y stage section 50 is turned on, while in the event that the power supply is off power supply to each section of the CPU 60, and to the camera section 10 and the X/Y stage section 50, is turned off. Power supply on/off for each of the other sections may also be performed in tandem with power supply on/off of the camera section 10 etc. However, even if the power supply is off, a minimal power supply is provided in order to execute functions for determining instructions from the cell observation auxiliary control section 220. For example, power for only the basic sections of the CPU 60 and for the wireless communication device 18 is supplied even when the power supply is off. As a result of this power supply control it becomes possible to reduce wasteful energy consumption.

If the result of determination in step S3 is not power supply on/off communication, it is determined whether or not various wireless communication information has been acquired (S7). If the user performs various settings by operating the cell observation auxiliary control section 220, this setting information is transmitted from the communication section 228 of the cell observation auxiliary control section 220 by means of wireless communication. Information that is necessary to imaging is also transmitted by wireless communication from the communication section 228. For example, as information that is transmitted here there is information relating to transmission destination of the image data, conditions for at the time of imaging, various parameters, and measurement conditions for when measuring the specimen 81, and information relating to the cell culture vessel 80 for arrangement of the specimen, etc. As information relating to the cell culture vessel 80, there is information relating to vessels of a plurality of different shapes (refer to FIG. 4A to FIG. 4C). In this step, it is determined whether or not these items of information and settings have been received by the wireless communication device 18 within the cell observation device 1.

If the result of determination on step S7 is that various wireless communication information has been acquired, information acquisition, various settings and communication etc. are carried out (S9). In this step various settings within the cell observation device 1 are performed based on the various information and settings that have been acquired by the wireless communication device 18.

Once the information acquisition, various settings and communication etc., have been carried out in step S9, or if the result of determination in step S7 was that various information has not been acquired, it is next determined whether or not a manual position designation has been received (S11). There may be cases where the user wishes to observe images at a position that has been designated during preparations for measurement of the specimen 81 within the cell culture vessel 80, or during measurement itself. In this case the user can designate imaging position by operating the cell observation auxiliary control section 220. In this step, it is determined whether or not wireless communication for carrying out this manual position designation has been received.

If the result of determination in step S11 is that manual position designation has been received, alignment setting is performed (S13). Here, if description is given with the example shown in FIG. 2, the movement control section 33 moves the camera section 10 to a manual position that has been designated by means of wireless communication, by performing control of drive of the Y actuator 31a and the X actuator 31b. Also, if description is given with the example shown in FIG. 3A and FIG. 3B, the CPU 60 issues instructions to the X/Y stage section 50 so as to move the camera section 10.

If alignment setting has been performed in step S13, or if it has been determined that manual position designation has not been received, it is next determined whether or not a focus select mode instruction has been received (S15).

As was described using FIG. 7 to FIG. 9C, for the purpose of visual recognition of the cells 81 by the user it is desirable to move the focus lens 11a to an in focus position (best focus position) (refer to imaging surface position p in FIG. 7, best focus position Pb in FIG. 8, and FIG. 9A). Also, for the purpose of counting a number of cells, it is desirable to move the focus lens 11a to an imaging surface position where the cell boundary becomes black (refer to imaging surface position q in FIG. 7, focus position Pq in FIG. 8, and FIG. 9B). Also, when measuring density of cells, the focus lens 11a may be moved to an imaging surface position where a cell boundary becomes black. Further, for the purpose of measuring density of cells, it is desirable to move the focus lens 11a to an imaging surface position where the inside of a cell becomes black (refer to imaging surface position r in FIG. 7, focus position Pr in FIG. 8, and FIG. 9C). In the case of counting a number of cells, the focus lens 11a may be moved to a imaging surface position where the inside of a cell becomes black.

Since the user designates focus selection mode (for observation, for number of cells count, for cell density measurement) in accordance with their intention, in this step S15 it is determined whether or not any purpose has been designated by the user with focus selection mode.

If the result of determination in step S15 is that focus selection mode has been designated, setting for focus selection mode is performed (S17). Here, setting for the focus selection mode that has been designated by the user is performed.

If focus selection mode has been set in step S17, or if the result of determination in step S15 is that focus selection mode was not received, it is next determined whether or not an AF operation instruction has been received (S19). AF operation is instructed to the cell observation device 1 either automatically from the cell observation auxiliary control section 220, or as a result of the user operating the cell observation auxiliary control section 220. In this step S19 determination is for whether or not an AF operation has been instructed from the cell observation auxiliary control section 220.

If the result of determination in step S19 is that an AF operation has been received, AF processing is performed (S21). Here, focus adjustment of the focus lens 11a is performed in accordance with the focus selection mode that was set in step S17. Detailed operation of this AF processing will be described later using FIG. 12.

If AF processing has been performed in step S21, or if the result of determination in step S19 was that an AF operation instruction was not received, it is determined whether or not an image request has been received (S23). There may be cases where the user, while preparing for measurement or during measurement, wishes to observe images at the manual position that has been designated. In such cases, an image request is transmitted by operating the cell observation auxiliary control section 220. There may also be cases where, during measurement, the user wishes to confirm images that have been captured so far, and in this type of situation also an image request is transmitted by operating the cell observation auxiliary control section 220. In this step, therefore, it is determined whether or not an image request signal has been received from the cell observation auxiliary control section 220.

If the result of determination in step S23 is that there is an image request signal, image data is acquired and wireless communication is performed (S25). In this case, imaging is performed at the point where alignment was performed in step S13, and that image data is transmitted to the cell observation auxiliary control section 220. In the event that, during measurement, there has been a request to transmit image data that has been acquired so far, image data that has been stored in the storage section 71 is read out and transmitted to the cell observation auxiliary control section 220.

If image data has been acquired and wireless transmission has been performed in step S25, or if the result of determination in step S23 is that an image request has not been received, processing returns to step S1 and the previously described processing is executed.

In this way, in the flow for imaging section communication, in the cell observation device 1 cells are imaged in accordance with instruction from the cell observation auxiliary control section 220 (or cell observation main control unit 210), and images that have been acquired are transmitted to the cell observation auxiliary control section 220 (or cell observation main control unit 210) (refer to S25). Also, when acquiring images of cells, focus adjustment of the focus lens 11a is performed in accordance with a focus selection mode that has been instructed from the cell observation auxiliary control section 220 (or cell observation main control unit 210) (refer to S17 and S21). This means that when the user observes cells, in a case where a number of cells is counted, in a case where cell density is measured, etc., it is possible to acquire images in accordance with intended use.

Figure 11:
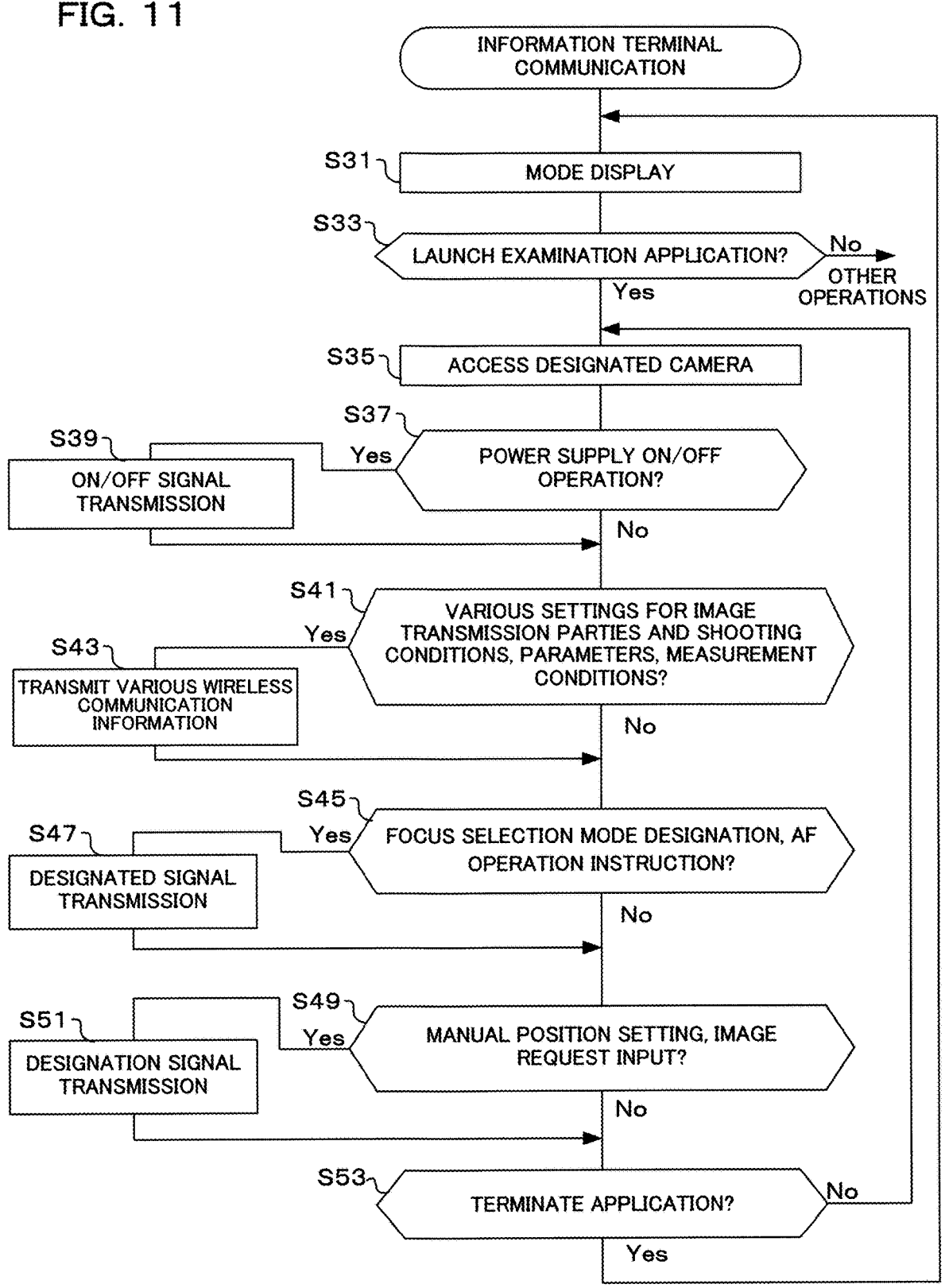
FIG. 11 is a flowchart showing operation of an information terminal of one embodiment of the present invention.

Next, operation of the cell observation auxiliary control unit 220 will be described using the flowchart for information terminal communication shown in FIG. 11. This flowchart is implemented by the control section (CPU etc.) within the cell observation auxiliary control unit 220 controlling each of the sections within the cell observation auxiliary control unit 220 in accordance with program code that has been stored within the storage section. In this flowchart, description will be given for when the user controls the cell observation device 1 using the cell observation auxiliary control unit 220, but control may also be performed using the cell observation main control unit 210.

If the flow for information terminal communication is entered, first mode display is carried out (S31). Here, a mode of the cell observation auxiliary control unit 220 is displayed on the display section 229. For example, if the cell observation auxiliary control unit 220 doubles as a smartphone, there are mobile phone mode, mail mode etc.

Once mode display has been carried out, it is next determined whether or not to launch an examination application (S33). Here it is determined whether or not an application for examination (measurement) that counts a number of cells 81a of the specimen 81 or performs measurement of cell density etc. (hereafter referred to as "examination application") will be launched. For example, an examination application icon is displayed, and if a touch operation is performed on this icon it is determined that the examination application will be launched. As well as the examination application there may also be applications to analyze images of cells. Also, as an application selection method, besides a touch operation, it may be determined to launch the application if a cursor is moved to select an icon, and it may be determined to launch the application if a dedicated button is operated. If the result of this determination is not to launch the examination application, then other operations, for example, in the case of a smartphone, mobile phone operations and mail operations, are performed.

If the result of determination in step S33 is to launch the examination application, then a designated camera is accessed (S35). Here, a camera that was designated by the cell observation auxiliary control unit 220 (the cell observation device 1 with the example of FIG. 1 and FIG. 2) is accessed. Specifically, communication is performed from the communication section 228 of the cell observation auxiliary control unit 220 to the wireless communication device 18 of the cell observation device 1.

Next it is determined whether or not a power supply on/off operation has been carried out (S37). The cell observation device 1 is placed in a chamber such as an incubator, a specimen 81 inside the cell culture vessel 80 is examined, and supply of power is received from the power supply battery. In order to prevent power supply consumption, it is possible for the user to instruct power supply on/off for the cell observation device 1 from the cell observation auxiliary control unit 220. Here, it is determined whether or not a power supply on/off operation was performed in the cell observation auxiliary control unit 220.

If the result of determination in step S37 is that a power supply on/off operation has been performed, an on/off signal is transmitted (S39). Here, a power supply on/off signal is transmitted from the communication section 228 of the cell observation auxiliary control unit 220 to the wireless communication device 18 of the cell observation device 1. The cell observation device 1 executes a power supply on/off operation (refer to S5 in FIG. 10) if this signal is received (refer to S3 in FIG. 10).

If the on-off signal has been transmitted in step S39, or if the result of determination in step S37 is that a power supply on/off operation is not performed, it is next determined whether or not to perform various settings, such as for image transmission parties, shooting conditions, parameters and measurement conditions etc. (S41). It is possible to designate destinations for transmission of image data that has been captured by the cell observation device 1, and various information that is attached to the image data as tags (time and date information, position information, measurement (examination) result information). Transmission destinations are not limited to the cell observation main control unit 210 or the cell observation auxiliary control unit 220, and may be other information terminals etc.

Also, shooting conditions (focus position, aperture value, shutter speed value, ISO sensitivity value, switching of image processing including enhancement of edges, contrast and color etc., and brightness pattern and wavelength of illumination) for when the cell observation device 1 is imaging, and similarly parameters and measurement conditions, may also be set. For a movement pattern also, a pattern other than a pattern stored as default in the storage section 71 of the cell observation device 1, or storage section of the cell observation auxiliary control unit 220, may be set. Information etc. relating to the cell culture vessel 80 for the purpose of arranging the specimen may also be set. As information relating to the cell culture vessel 80, there is information relating to vessels of a plurality of different shapes (refer to FIG. 4A to FIG. 4C). In this step S41, it is determined whether or not an operation has been performed in order to perform these various settings.

If the result of determination in step S41 is that operations for various settings have been performed, various wireless communication information is transmitted (S43). Here, operated information is transmitted from the communication section 228 to the wireless communication device 18 of the cell observation device 1 based on the determination in step S41 (refer to S7 and S9 in FIG. 10).

If various wireless communication information has been transmitted in step S43, or if the result of determination in step S41 was that an operation for various settings was not performed, it is next determined whether or not there is focus selection mode instruction or AF operation instruction (S45). As was described previously, with this embodiment, when the user observes cells, when the number of cells is counted, when cell density is measured etc. it is possible to select a focus mode that is suitable for acquisition of images in accordance with that intention (refer to S15 in FIG. 10). This selection is performed using the display section and input section of the cell observation auxiliary control unit 220 (the cell observation main control unit 210 may also be used). It is also possible for the user to instruct AF operation (refer to S19 in FIG. 10).

In this step S45 determination is based on whether or not the user has designated focus selection mode, and whether or not AF operation has been instructed. It should be noted that it may be made possible for these designations and instructions to be performed automatically by the cell observation auxiliary control unit 220 (or by the cell observation main control unit 210).

If the result of determination in step S45 is that focus selection mode has been designated, and if AF operation has been instructed, a designation signal is transmitted to the cell observation device 1 (S47). Here, a designation signal is transmitted from the communication section 228 of the cell observation auxiliary control unit 220 to the wireless communication device 18 of the cell observation device 1.

If a designation signal has been transmitted in step S47, or if the result of determination in step S45 was that there was no focus selection mode designation and there was no AF operation instruction, it is next determined whether or not manual position setting or an image request have been input (S49). As was described previously, if the user designates position of the camera section 10 when preparing for measurement or during measurement, and they wish to observe images that have been acquired with the camera section 10, it is possible to perform instruction from the cell observation auxiliary control unit 220. In this step, it is determined whether or not these operations have been performed.

It should be noted, regarding position designation of the camera section 10, that instruction may be by absolute position, such as (x, y) coordinates, and may be instruction of movement by relative positional designation in a horizontal direction and vertical direction, while observing an image. Besides this it is also possible to have movement control in accordance with operation amount of a touch panel, switch or dial of the operation section, and to determine a typical observation point and instruct movement to that location.

If the result of determination in step S49 is that manual position setting or an image request have been input, designation signals are transmitted (S51). Here signals corresponding to operations in step S49 are transmitted from the communication section 228 to the wireless communication device 18 of the cell observation device 1 (refer to S11-S17 in FIG. 10).

If designation signals have been transmitted in step S51, or if the result of determination in step S49 was that manual position setting or an image request were not input, it is next determined whether or not to terminate the application (S53). Here it is determined whether or not an instruction to terminate operation of the examination application, that was launched in step S33, has been issued. If the result of this determination is that the examination application is not to be terminated processing returns to step S35, while if the examination application is to be terminated processing returns to step S31.

In this manner, in the flow for information terminal communication, if various setting operations are performed in the cell observation auxiliary control unit 220 in order to move the camera section 10, signals are transmitted by means of the communication section 228 to the wireless communication device 18 of the cell observation device 1 based on settings (for example, S39, S43, S47, S51). Although not described in the flowchart, image data that has been acquired by the camera section 10 is transmitted from the wireless communication device 18 of the cell observation device 1 to the communication section 228 of the cell observation auxiliary control unit 220 for the purpose of cell observation, counting of number of cells, measurement of cell density etc.

Also, in the flow for information terminal communication, if setting of focus selection mode has been performed in the cell observation auxiliary control unit 220, that mode is transmitted to the cell observation device 1 (refer, for example, to S45 and S47). This means that depending on whether the user wants to observe cells, wants to count a number of cells, or wants to measure cell density, it is possible to acquire images that are suitable for that intention.

Next, operation of AF processing (refer to S21 in FIG. 10) will be described using the flowchart shown in FIG. 12. If the flow for AF processing is commenced, first initial lens drive is performed (S61). A specimen 81 (cells 81a) constituting an object of focusing is at a position in a specified range that is within a movement range of the focus lens 11a. As a result in step S61 the focus lens 11a is moved to an initial position so that it is possible to commence lens drive from close to the specified range. It should be noted that a reference position is detected by a focus lens reference position detection section 12c, and thereafter the initial position is detected based on a number of pulses that have been applied to the LD motor 12b. Besides this detection method, initial position may also be detected by providing a sensor that detects position of the focus lens 11a.

Once the focus lens 11a has been moved to the initial position, lens scan is commenced (S63). Here, the focus lens 11a is moved in the optical axis direction by the LD motor 12b.

If lens scan has been commenced, next an AF evaluation value is acquired (S65). Here, an AF evaluation value is calculated by the image processing section 63 every time image data for a single frame is acquired by the image sensor 12a (refer to FIG. 5A and FIG. 5B).

If AF evaluation value has been acquired, it is next determined whether or not the end of a designated range has been reached (S67). As was described previously, a focus lens position for focusing on a specimen 81 (cells 81a) constituting an object is in a specified range within movement range of the focus lens 11a, and here it is determined whether or not the end of this specified range (end of designated range) has been reached. If the result of this determination is that the end of the designated range has not been reached, processing returns to step S65 and AF evaluation value is calculated every time image data is acquired for a single frame.

If the result of determination in step S67 is that the end of the designated range has been reached, focus detection processing is performed (S69). Here, focus adjustment is performed in accordance with focus selection mode that was set in step S17 (refer to FIG. 10). Detailed operation of this focus detection processing will be described later using FIG. 13.

If focus detection processing has been performed, it is next determined whether or not AF is OK (S71). In focus detection processing, if a focus position has been detected a flag for the AF result being OK is set (refer to S95 in FIG. 13). In this step determination is based on whether or not the AF OK flag has been set.

If the result of determination in step S71 is that the AF result is OK, focus drive is performed (S73). The focus lens 11a is driven to the focus position that was detected in the focus detection processing (S85, S91 and S93 in FIG. 13), by drive of the LD motor 12b.

On the other hand, if the result of determination in step S71 is that the AF result is not OK, the focus lens 11a is driven to a designated lens position (S75). In this case, the focus lens 11a is driven to a predetermined focus position (designated lens position) by the LD motor 12b. As a predetermined focus position, a position where there is a high possibility of cells 81a existing is appropriately determined.

If the focus lens 11a has been driven in step S73 or S75, the originating flow is returned to.

In this way, in the AF processing, AF evaluation value is acquired based on image data while moving the focus lens 11a (S65), and focus position is detected based on this AF evaluation value.

Next, operation of focus detection processing (refer to S69 in FIG. 12) will be described using the flowchart shown in FIG. 13. If the flow for focus detection processing is commenced, it is first determined whether or not there is a peak (S81). A focus lens position where AF evaluation values, that have been calculated discretely in step S65 while moving the focus lens, or moving the focus lens a specified amount at a time, change from increasing to decreasing constitutes a peak. Then, after the AF evaluation values have changed to decreasing, an AF evaluation value corresponding to focus lens position exceeding a specified value and decreasing is confirmed, and a peak is determined. In this step, it is determined whether or not one or more peaks exist.

If the result of determination in step S81 is that there is not a peak, the AF result is set to NG (S97). Since is it not possible to detect AF evaluation value peak, which makes it impossible to detect in focus position using a contrast method, an NG flag is then set as the AF result.

On the other hand, in the event that the result of determination in step S81 is that there is a peak, it is determined whether or not there is a single peak (S83). A single peak is a case where only where one AF evaluation value peak appears, as was shown in FIG. 6 (and also similarly to the dashed line in FIG. 8). At this time it is determined whether only one peak appears within a specified range. A specified range may be the entire lens scan range, or may be only a part of the lens scan range, that is, a central portion excluding end portions, or the lens scan range may be divided into a plurality of ranges with determination performed in respective ranges.

If the result of determination in step S83 is that there is a single peak, the peak position is set to the focus position (S85). In this case, position of the focus lens corresponding to the AF evaluation value peak is stored as focus position. The focus lens 11a is driven to this position that has been stored (refer to S73 in FIG. 12).

On the other hand, in the event that the result of determination in step S83 is that there is not a single peak, it is determined whether or not a peak is a double peak (S87). A double peak is a case where two AF evaluation value peaks appear, as shown by the solid line in FIG. 8. If the result of this determination was that there is not a double peak, then since it is not possible to detect focus position the NG flag is set as the AF result, similarly to step S97 (S98). It should be noted that in the determination for double peak, a gap between focus lens positions (Pr-Pq), which is a distance between peaks, being within a specified range is made a condition. In the case of a specimen such as cells, thickness is physically limited due to its structure, which means that in the event that a distance between peaks is larger than a given value one of a plurality of peaks is excluded.

If the result of determination in step S87 is that there is a double peak, it is determined whether a focus selection mode is observation mode or analysis mode (S89). Observation mode is performing focus that is suitable for the user to observe cells 81a on the display section 75 on the display section 75 (refer to FIG. 9A). Also, analysis mode is performing focus that is suitable for measurement of number of cells or cell density of the cells 81a (refer to FIG. 9B and FIG. 9C). Determination of observation mode or analysis mode is determination based on focus selection mode that was set in step S17 (refer to FIG. 10).

If the result of determination in step S89 is that observation mode has been set, a minimum position where the AF evaluation value positioned between two peaks becomes minimum is set to the focus position (S91). In this case, the minimum position for AF evaluation value (best focus position Pb in FIG. 8) is stored as focus position of the focus lens 11a. The focus lens 11a is driven to this position that has been stored (refer to S73 in FIG. 12).

On the other hand, if the result of determination in step S89 is that analysis mode has been set, peak position of either of the two peaks (focus lens position corresponding to a peak) is set to the focus position (S93). As shown in FIG. 8, in the case of a double peak, peaks appear on both sides of a minimum value of AF evaluation value. In this step, a position of the focus lens 11a corresponding to either of the peak positions is stored as focus position. The focus lens 11a is driven to this position that has been stored (refer to S73 in FIG. 12). It should be noted that as was described previously, one of the peaks at either of the two sides may be selected in accordance with whether a number of cells is being counted or cell density is being measured. The way in which a number of cells is counted and cell density is detected will described later using FIG. 14A and FIG. 14B.

If a focus position has been stored in steps S85, S91 or S93, an OK flag is set as the AF result (S95). Since it has been possible to set focus position in the above described steps, the OK flag is set.

If the OK flag has been set in step S95, or if the NG flag has been set in step S97, the originating flow is returned to.

In this way, in the flow for focus detection processing, setting of focus position of the focus lens 11a is made different depending on whether the AF evaluation value has a single peak or has a double peak (refer to S85, S91 and S93). This means that it is possible to perform accurate focus adjustment, even in cases such as where there are two peaks in AF evaluation value change in accordance with focus lens position.

Also, by setting a focus selection mode, it is possible to perform focus adjustment that is suitable to observation of cells and to perform focus adjustment that is suitable for analysis of cells, such as number of cells. It should be noted that as an analysis mode, it is possible to suitably change setting of focus position, so as to perform analysis other than counting of number of cells and measurement of cell density. For example, an analysis mode may be employed such that it is possible to determine viability of cells by detecting and analyzing shape of cells from image data, etc.

Figure 14A:
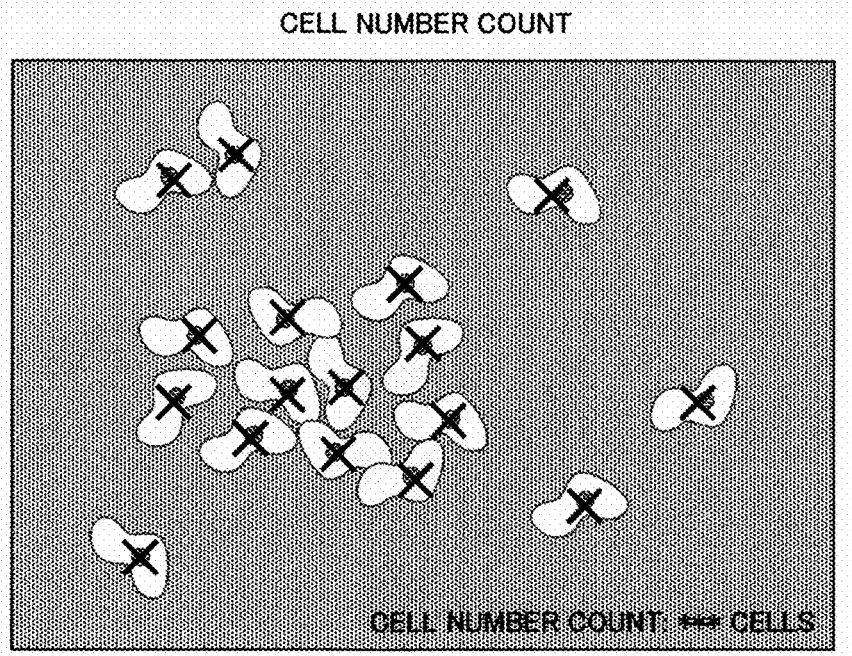
FIG. 14A and FIG. 14B are drawings showing cell number count and detection of cell density, in the cell observation device of one embodiment of the present invention.

Next, analysis modes of counting a number of cells and detecting cell density (confluency) will be described using FIG. 14A and FIG. 14B. FIG. 14A shows an example of a cell number count. In the case of counting the number of cells, imaging is performed at a focus position such that a boundary of a cell is displayed black and the inside of the cell is displayed white, or displayed brightly, as shown in FIG. 9B. Namely, a number of cells that satisfy such conditions should be counted. In FIG. 14A portions that satisfy these conditions are detected by image analysis (in the drawing these portions have an x mark attached), and these x marks are counted. Also, as shown in FIG. 9C, imaging is performed at a focus position such that a boundary line is display white and an inner part is displayed black, and portions where a boundary line is black and an inside is white may be recognized as cells and counted.

Figure 14B:
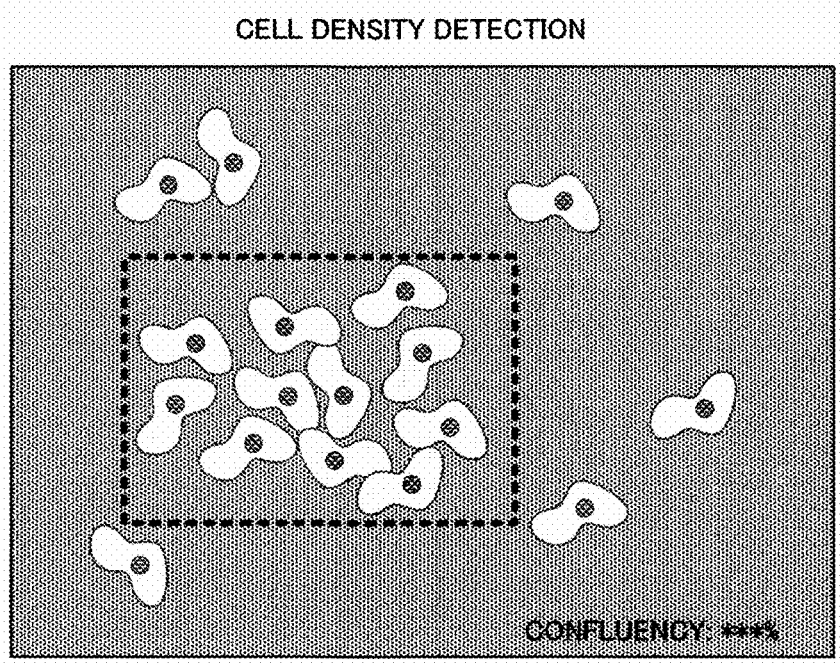

FIG. 14B shows an example of detecting cell density. In the case of detecting cell density, imaging is performed at a focus position such that a boundary line is displayed white and the inside is displayed black, as shown in FIG. 9C, or such that an image represents the luminance. Therefore, in a set region (inside the dashed line in FIG. 14B) it is possible to calculate density by calculating area of a portion in which the inside is black. As shown in FIG. 9B, imaging is performed at a focus position such that cell boundaries become black and the inside of cells becomes white, and density of cells may be calculated by recognizing portions where the boundary is black and the inside as cells, and calculating area of white portions constituting the inside of cells.

Next a modified example of one embodiment of the present invention will be described using FIG. 15 and FIG. 16. With the one embodiment of the present invention, there were one or two peaks of AF evaluation value. In this modified example, it is possible to detect focus position even if there are 1 to 3 peaks of AF evaluation value.

A case where there are three peaks of AF evaluation value will be described using FIG. 15. In FIG. 15, the dashed line shows a relationship between focus lens position and AF evaluation value in a case where there is no light condensing effect caused by the cells 81a. Also, the solid line in FIG. 15 shows a case where there is a light condensing effect caused by the cells 81a. Position Pb is a best focus position.

With the example shown in FIG. 8, there were two maximum values for AF evaluation value, namely peak Q (Pq position) and peak R (Pr position), and one minimum value of P (Pb position). The minimum value P was originally a peak with the AF evaluation value shown by the dashed line, but P becomes a minimum value when the values of the peak Q and the peak R become large. The example shown by the solid line in FIG. 15 is a case where the light condensing effect due to the cells 81a is stronger than in the example shown in FIG. 8. Therefore, since the peak Q and the peak R of AF evaluation value do not become larger than in the example shown in FIG. 8, the peak P of AF evaluation value remains, and three peaks, namely peaks Q', P' and R', occur. In the state shown by the solid line in FIG. 15, in a case where the peaks Q' and P', for example, are detected as a double peak, and observation mode has been selected, focus is performed to a focus position corresponding to a minimum value between the peaks Q' and P'. In this case, a problem arises in that it is not possible to focus the lens to a position that is suitable for observation.

Next focus detection processing of this modified example will be described using the flowchart shown in FIG. 16. The focus detection processing of this modified example is the same as steps S81 to S97 of the focus detection processing of this embodiment that was shown in FIG. 13, and so duplicate steps are omitted, step S98 is omitted, and only steps S99 to S107 have been added. Description will therefore center on these different steps.

If the flow for focus detection processing is commenced, determination of whether or not there is a double peak is performed in step S87, and if the result of this determination is that there is not a double peak determination as to whether or not there is a triple peak is performed (S101). A triple peak is a case where three AF evaluation value peaks appear, as shown by the solid line in FIG. 15. If the result of this determination is that there is not a triple peak, then since there is also no single peak and no double peak, it is determined that it is not possible to detect focus position without the existence of a peak, and similarly to steps S97 and S98 the NG flag is set as the AF result (S99).

If the result of determination in step S101 is that there is a triple peak, then similarly to step S89 it is determined whether a focus selection mode is observation mode or analysis mode (S103). As was described previously, observation mode is performing focus that is suitable for the user to observe cells 81a on the display section 75 on the display section 75 (refer to FIG. 9A). Also, analysis mode is performing focus that is suitable for measurement of number of cells or cell density of the cells 81a (refer to FIG. 9B and FIG. 9C). Determination of observation mode or analysis mode is determination based on focus selection mode that was set in step S17 (refer to FIG. 10).

If the result of determination in step S103 is that observation mode has been set, a center peak position is set to the focus position (S105). In this case, a peak position that is in the middle of the three peaks (best focus position Pb in FIG. 15) is stored as focus position of the focus lens 11a. The focus lens 11a is driven to this focus position that has been stored (refer to S73 in FIG. 12).

On the other hand, if the result of determination in step S103 is that analysis mode has been set, either of the left and right peak positions (positions corresponding to Q' or R') is set to the focus position (S107). As shown in FIG. 15, in the case of a triple peak, peaks Q' and R' also appear on either side of a central peak P' of AF evaluation value. In this step, a position of the focus lens 11a corresponding to either of the left and right peak positions is stored as focus position. The focus lens 11a is driven to this focus position that has been stored (refer to S73 in FIG. 12). It should be noted that as was described previously, one of the peaks at either of the two sides may be selected in accordance with whether a number of cells is being counted or cell density is being measured (refer to FIG. 14A and FIG. 14B).

If a focus position has been stored in steps S85, S91, S93, S105 or S107, an OK flag is set as the AF result (S95). Since it has been possible to set focus position in the above described steps, the OK flag is set.

If the OK flag has been set in step S95, or if the NG flag has been set in step S97 or S99, the originating flow is returned to.

In this way, with the focus detection processing of this modified example, it is possible to appropriately adjust focus position of the focus lens 11a even for any of the case of a single peak (S81 in FIG. 13), the case of a double peak (S87) or the case of a triple peak (S101).

Also, in a case where the AF evaluation value has a triple peak, if observation mode is set as the focus selection mode, it is possible to move the focus lens to a focus position that is suitable for observation of a specimen 81, such as cells 81a, and focus adjustment that is suitable for observation of cells etc. is possible. Also, if analysis mode is set as the focus selection mode, it is possible to move the focus lens to a focus position that is suitable for analysis of a specimen 81, such as cells 81a, and highly accurate image analysis is possible.

As has been described above, with the one embodiment and modified example of the present invention, in a case where a plurality of maximum values (peaks) occur with change in AF evaluation value (contrast evaluation value) corresponding to change in focus position, a focus position is controlled to any one of focus positions corresponding to the plurality of maximum values (refer, for example, to Q and R in FIG. 8, S93 in FIG. 13, Q' and R' in FIG. 15, S107 in FIG. 16 etc.). This means that even if two or more peaks appear in a contrast curve due to the three-dimensional structure of cells, it is possible to adjust to an appropriate focus position depending on the intended use. In particular, it is possible to provide images that are suitable for analysis of cells.

Also, with the one embodiment and modified example of the present invention, when image data for observation is generated by the image processing circuit (observation image data generating section), if a plurality of maximum values appear with change in AF evaluation value corresponding to change in focus position, there is control to a focus position corresponding to an extreme value of contrast evaluation value that is positioned between focus positions corresponding to the plurality of maximum values (refer, for example, to P in FIG. 8, S91 in FIG. 13, P' in FIG. 15, S105 in FIG. 16, etc.). This means that even if two or more peaks appear in a contrast curve due to the three-dimensional structure of cells, it is possible to adjust to an appropriate focus position depending on the intended use. In particular, it is possible to provide images that are suitable for observation of cells.

Also, with the one embodiment and modified example of the present invention, there may be control to a focus position corresponding to a minimum value, among minimum values of contrast evaluation value, that is positioned between focus position corresponding to a plurality of maximum values. Specifically, in the event that there are a plurality of minimum values of contrast evaluation value, control is performed to a focus value corresponding to a minimum value among these minimum values. In this case, even if there are a plurality of minimum values, it is possible to display cells to provide images that are very suitable for observation.

Also, with the one embodiment and the modified example of the present invention, focus position of an image sensor (imaging section) is changed (refer, for example to S63 in FIG. 12), contrast evaluation value is calculated based on image data within a specified range of an imaging surface where there is output of the image sensor (imaging section) (refer, for example, to S65 in FIG. 12), focus is controlled based on the contrast evaluation value (refer, for example, to S73 in FIG. 12), and in a case where a plurality of maximum values occur with change in contrast evaluation value corresponding to change in focus position (for example, S87 in FIG. 13 and S101 in FIG. 16) focus position is controlled to any one of focus positions corresponding to the plurality of maximum values (for example, S93 in FIG. 13 and S107 in FIG. 16). This means that even if two or more peaks appear in a contrast curve due to the three-dimensional structure of cells, it is possible to adjust to an appropriate focus position depending on the intended use. In particular, it is possible to provide images that are suitable for analysis of cells.

It should be noted that with the one embodiment and modified example of the present invention, description has been given for examples where AF evaluation value becomes large if there are a lot of high frequency components, and so a maximum value of AF evaluation value constituted an in focus position. However, conversely, it is possible to perform calculation of AF evaluation value such that AF evaluation value becomes small if there are a lot of high frequency components, and in this case also it is possible to apply this embodiment.

Also, with the one embodiment and modified example of the present invention, description has been given using examples where, as image analysis of a specimen such as cells, a number of cells are counted and density of cells is measured. However, image analysis is not limited to these examples, and other image analysis may also be performed, such as measurement of cell shape etc. In this case, an AF evaluation value peak should be selected in accordance with image analysis, and also focus control is not limited to being performed to a peak position, and may be performed to a position that has a specified relationship to peak position.

Also, with the one embodiment and modified example of the present invention, adjustment of focus is performed by moving the focus lens 11a by driving the LD motor 12b utilizing the LD motor control section 61 and control of the LD motor driver 51. However, this is not limiting and it is also possible to adjust focus by moving the imaging section (camera section 10) or the image sensor 12a within the imaging section 10 in the optical axis direction of the photographing lens 11. Also, adjustment of focus may be performed by moving the top board 40 in the optical axis direction of the photographing lens 11, to move the cell culture vessel 80 that contains the cells 81a in the optical axis direction.

Also, with the one embodiment and modified example of the present invention, some sections of the LD motor control section 61 etc. within the CPU 60 have been implemented in a software manner using programs, but some or all of these sections may be constructed as hardware circuits separate to the CPU 60, and may also be realized using a separate CPU. It is possible for these sections to have a hardware structure such as gate circuits generated based on a programming language that is described using Verilog, and also to use a hardware structure that utilizes software such as a DSP (digital signal processor). Suitable combinations of these approaches may also be used.

Also, with the one embodiment and modified example of the present invention, as a measurement subject description has been given using an example of a specimen 81 (cells) that have been cultivated in a culture medium within the vessel 80, but this is not limiting as long as there is a specimen such that a plurality of peaks in AF evaluation value occur. The communication method also does not need to be limited to wireless communication, and wired communication may also be used. Besides this, this embodiment can be utilized in any remote shooting examination system, device or method that carries out combination of performance examination of products, performance examination of parts and packages, movement control and shooting control.

Also, among the technology that has been described in this specification, with respect to control that has been described mainly using flowcharts, there are many instances where setting is possible using programs, and such programs may be held in a storage medium or storage section. The manner of storing the programs in the storage medium or storage section may be to store at the time of manufacture, or by using a distributed storage medium, or they be downloaded via the Internet.

Also, with the one embodiment of the present invention, operation of this embodiment was described using flowcharts, but procedures and order may be changed, some steps may be omitted, steps may be added, and further the specific processing content within each step may be altered. It is also possible to suitably combine structural elements from different embodiments.

Also, regarding the operation flow in the patent claims, the specification and the drawings, for the sake of convenience description has been given using words representing sequence, such as "first" and "next", but at places where it is not particularly described, this does not mean that implementation must be in this order.

As understood by those having ordinary skill in the art, as used in this application, 'section,' 'unit,' 'component,' 'element,' 'module,' 'device,' 'member,' 'mechanism,' 'apparatus,' 'machine,' or 'system' may be implemented as circuitry, such as integrated circuits, application specific circuits ("ASICs"), field programmable logic arrays ("FPLAs"), etc., and/or software implemented on a processor, such as a microprocessor.

The present invention is not limited to these embodiments, and structural elements may be modified in actual implementation within the scope of the gist of the embodiments. It is also possible form various inventions by suitably combining the plurality structural elements disclosed in the above described embodiments. For example, it is possible to omit some of the structural elements shown in the embodiments. It is also possible to suitably combine structural elements from different embodiments.

What is claimed is:

1. An observation device, comprising:
    an image sensor that forms an image of cells;
    a processor having
        a focus control section changing focus position of the image sensor and calculating contrast evaluation value based on image data output by the image sensor, and controlling focus based on the contrast evaluation value, and
        an analyzer executing at least one of measurement of a number of the cells and measurement of density of the cells, by analyzing the cells based on image data output by the image sensor; and
    an image processing circuit that generates image data for observation in order to perform observation using display based on image data output by the image sensor,
    wherein the focus control section controls, responsive to a determination that both (1) image data for analysis of the cell by the analyzer is obtained and (2) a plurality of maximum values have been generated for change in contrast evaluation value corresponding to change in the focus position, a focus position to any focus position that corresponds to any of the plurality of maximum values, and the image sensor outputs image data that has been imaged, and
    the focus control section performs control, responsive to a determination that both (1) image data for observation is generated by the image processing circuit and (2) a plurality of maximum values have been generated for change in contrast evaluation value corresponding to change in the focus position, to a focus position corresponding to a minimum value of contrast evaluation value that is positioned between focus positions corresponding to the plurality of maximum values.

2. The observation device of claim 1, wherein:
    the analyzer measures shapes of the cells.

3. A focus adjustment method for an observation device that has an image sensor that forms images of cells, and an image processing circuit that generates image data for observation in order to perform observation using display based on image data output by the image sensor, the focus adjustment method comprising:
    changing focus position for the image sensor;
    calculating contrast evaluation value based on image data output by the image sensor;
    controlling focus based on contrast evaluation value;
    executing at least one of (A) measurement of number of the cells and (B) measurement of density of the cells, by analyzing the cells based on image data output by the image sensor;
    controlling, responsive to a determination that both (1) image data for analysis of the cell by the analyzer is obtained and (2) a plurality of maximum values have been generated for change in contrast evaluation value corresponding to change in the focus position, a focus position to any focus position that corresponds to any of the plurality of maximum values, and outputting image data that has been imaged by the image sensor; and performing control, responsive to a determination that both (1) image data for observation is generated by the image processing circuit and (2) a plurality of maximum values have been generated for change in contrast evaluation value corresponding to change in the focus position, to a focus position corresponding to a minimum value of contrast evaluation value that is positioned between focus positions corresponding to the plurality of maximum values.

4. The focus adjustment method of claim 3, further comprising:
measuring shapes of the cells.

5. A non-transitory computer-readable medium storing a processor executable code, which when executed by at least one processor, the processor being provided within an observation device that has an image sensor for forming an image of cells, and an image processing circuit that generate image data for observation in order to perform observation using display based on image data output by the image sensor, performs a focus adjustment method, the focus adjustment method comprising:

changing focus position for the image sensor;
calculating contrast evaluation value based on image data output by the image sensor;
controlling focus based on contrast evaluation value;
executing at least one of (A) measurement of number of the cells and (B) measurement of density of the cells, by analyzing the cells based on image data output by the image sensor;
controlling, responsive to a determination that both (1) image data for analysis of the cell by the analyzer is obtained and (2) a plurality of maximum values have been generated for change in contrast evaluation value corresponding to change in the focus position, focus position to any focus position that corresponds to any of the plurality of maximum values, and outputting image data that has been imaged by the image sensor; and performing control, responsive to a determination that both (1) image data for observation is generated by the image processing circuit and (2) a plurality of maximum values have been generated for change in contrast evaluation value corresponding to change in the focus position, to a focus position corresponding to a minimum value of contrast evaluation value that is positioned between focus positions corresponding to the plurality of maximum values.

6. The imaging device of claim 1, wherein:
analysis mode and observation mode are provided as focus selection modes, wherein
the focus control section controls, responsive to a determination that both (1) a plurality of maximum values have occurred with change in contrast evaluation value corresponding to change in the focus position, and (2) the analysis mode has been selected, a focus to a focus position corresponding to one focus position corresponding to any one of the plurality of maximum values, and
the focus control section controls, responsive to a determination that the observation mode has been selected, a focus to a focus position corresponding to a minimum value of the contrast evaluation value that is positioned between focus positions corresponding to the plurality of maximum values.

7. The imaging device of claim 1, wherein:
the focus control section controls, responsive to a determination that a distance between focus positions corresponding to the plurality of maximum values is larger than a given value, a focus to one focus position of focus positions corresponding to any one of the plurality of maximum values, even if image data for observation has been generated by the image processing circuit.

8. An observation device comprising:
an image sensor that forms an image of cells;
a processor having
a focus control section changing focus position of the image sensor and calculating contrast evaluation value based on image data output by the image sensor, and controlling focus based on the contrast evaluation value, and
an analyzer executing at least one of measurement of number of the cells and measurement of density of the cells, by analyzing the cells based on image data output by the image sensor; and
an image processing circuit that generates image data for observation in order to perform observation using display based on image data output by the image sensor,
wherein the focus control section controls, responsive to a determination that both (1) three maximum values have occurred with change in contrast evaluation value corresponding to change in focus position, and (2) the analysis section acquires image data in order to analyze the cells, a focus to a focus position other than a center, among focus positions corresponding to the three maximum values, and
the focus control section controls, responsive to a determination that both (1) three maximum values have occurred with change in contrast evaluation value corresponding to change in focus position and (2) image data for observation has been generated by the image processing circuit, a focus to a center focus position among focus positions corresponding to the three maximum values.

9. A focus adjustment method for an observation device that has an image sensor that forms images of a three dimensional specimen causing a light condensing effect when illuminated, the focus adjustment method comprising:
outputting image data of the three dimensional specimen while changing a focus position of the image sensor;
calculating contrast evaluation values based on image data output;
determining whether there is one or more than one peak contrast evaluation value using the calculated contrast evaluation values;
responsive to a determination that there is only one peak contrast evaluation value,
setting a focus position corresponding to the one peak contrast evaluation value,
and otherwise, responsive to a determination that there are more than one peak contrast evaluation values
determining whether a focus selection mode of the observation device is set to (A) an analysis mode, or (B) an observation mode, and
responsive to a determination that the focus selection mode is set to the analysis mode,
setting the focus position corresponding to any one of the more than one peak contrast evaluation values, and otherwise, responsive to a determination that the focus selection mode is set to the observation mode, setting the focus position corresponding to one of (A) a minimum contrast evaluation value occurring between two of the peak contrast evaluation values, or (B) a peak contrast evaluation value occurring between two of the peak contrast evaluation values.

10. The focus adjustment method of claim 9, wherein the three dimensional specimen includes cells.

11. The focus adjustment method of claim 9, further comprising:

determining whether there are two peak contrast evaluation values or three peak contrast evaluation values, wherein the act of setting the focus position corresponding to one of (A) a minimum contrast evaluation value occurring between two of the peak contrast evaluation values, or (B) a peak contrast evaluation value occurring between two of the peak contrast evaluation values sets, responsive to a determination that there are two peak contrast values, the focus position corresponding to a minimum contrast evaluation value occurring between two of the peak contrast evaluation values and otherwise, and otherwise sets, responsive to a determination that there are three peak contrast values, the focus position corresponding to a middle one of the three peak contrast evaluation values.

\* \* \* \* \*